(12) United States Patent
Eventoff

(10) Patent No.: US 9,214,146 B2
(45) Date of Patent: Dec. 15, 2015

(54) ELECTRONIC MUSICAL INSTRUMENTS USING MOUTHPIECES AND FSR SENSORS

(71) Applicant: Sensitronics, LLC, Bow, WA (US)

(72) Inventor: Franklin N. Eventoff, Bow, WA (US)

(73) Assignee: Sensitronics, LLC, Bow, WA (US)

(*) Notice: Subject to any disclaimer, the term of this patent is extended or adjusted under 35 U.S.C. 154(b) by 0 days.

(21) Appl. No.: 14/667,426

(22) Filed: Mar. 24, 2015

(65) Prior Publication Data

US 2015/0199947 A1 Jul. 16, 2015

Related U.S. Application Data

(63) Continuation of application No. 14/216,803, filed on Mar. 17, 2014, now Pat. No. 8,987,577.

(60) Provisional application No. 61/794,361, filed on Mar. 15, 2013.

(51) Int. Cl.
*G10H 1/32* (2006.01)
*G10H 3/00* (2006.01)
*G10H 1/34* (2006.01)
*G10H 1/055* (2006.01)
*G01L 1/20* (2006.01)

(52) U.S. Cl.
CPC .. *G10H 1/34* (2013.01); *G01L 1/20* (2013.01); *G10H 1/0558* (2013.01); *G10H 1/342* (2013.01); *G10H 3/00* (2013.01); *G10H 2220/301* (2013.01); *G10H 2220/361* (2013.01)

(58) Field of Classification Search
CPC .................. G10H 2220/361; G10H 2230/221; G10H 1/0558; G10H 2250/461
USPC ..................................................... 84/723, 744
See application file for complete search history.

(56) References Cited

U.S. PATENT DOCUMENTS

| 4,268,815 | A | * | 5/1981 | Eventoff et al. | 338/69 |
| 4,489,302 | A | * | 12/1984 | Eventoff | 338/99 |
| 4,810,992 | A | * | 3/1989 | Eventoff | 338/99 |
| 5,245,130 | A | * | 9/1993 | Wheaton | 84/742 |
| 6,005,181 | A | * | 12/1999 | Adams et al. | 84/734 |
| 6,018,118 | A | * | 1/2000 | Smith et al. | 84/600 |
| 7,741,555 | B2 | * | 6/2010 | Onozawa | 84/653 |
| 7,829,780 | B2 | * | 11/2010 | Onozawa | 84/732 |
| 8,607,651 | B2 | * | 12/2013 | Eventoff | 73/862.627 |
| 2014/0090547 | A1 | * | 4/2014 | Udell, III | 84/626 |

* cited by examiner

*Primary Examiner* — Jeffrey Donels
(74) *Attorney, Agent, or Firm* — K. David Crockett, Esq.; Paul J. Backofen, Esq.; Crockett & Crockett, PC

(57) ABSTRACT

Electronic musical instruments as disclosed, include sensors to digitize and alter the sound using FSR sensors in the mouthpieces and other elements of the instrument to mimic the variations available in analog instruments.

2 Claims, 28 Drawing Sheets

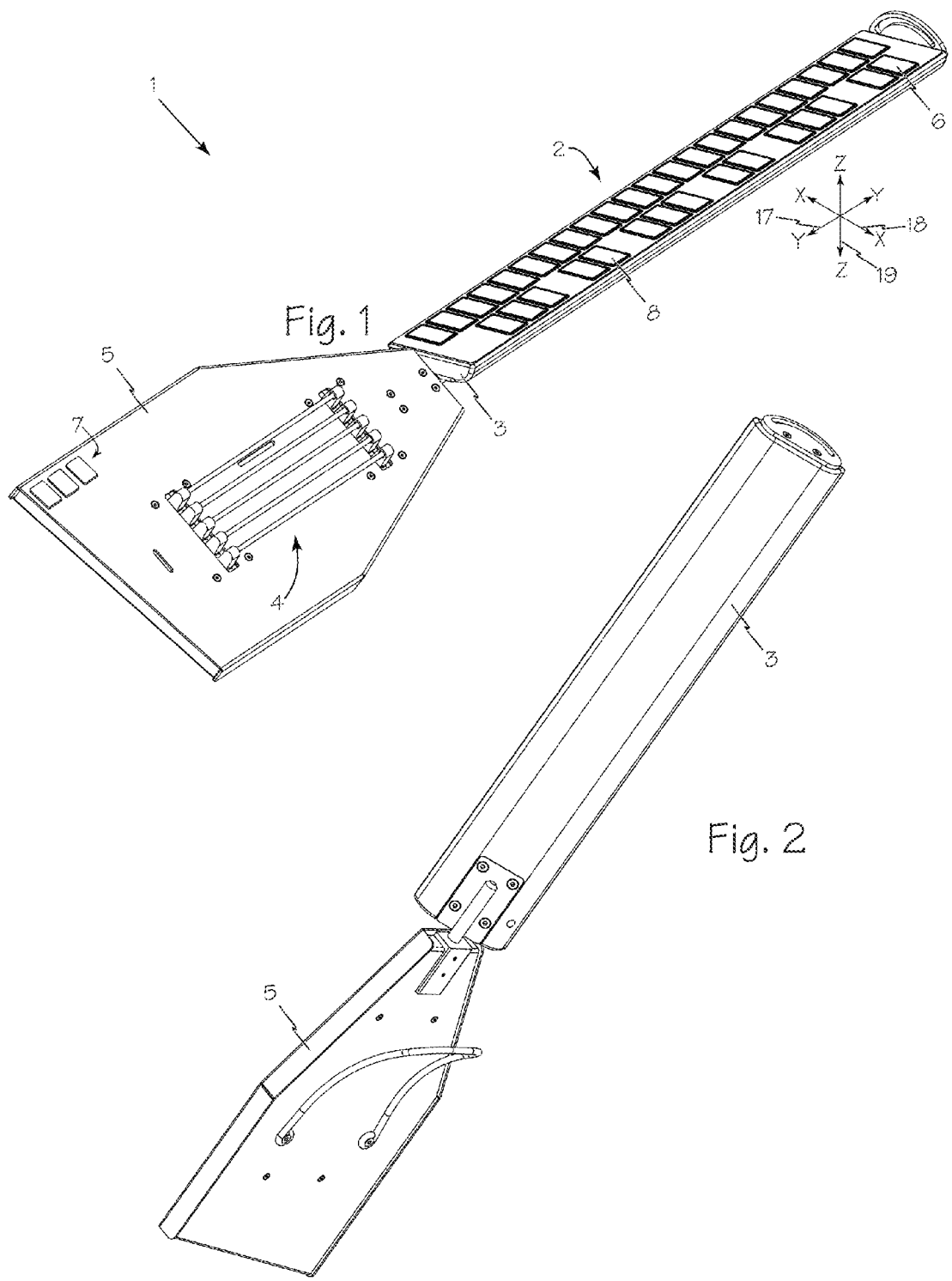

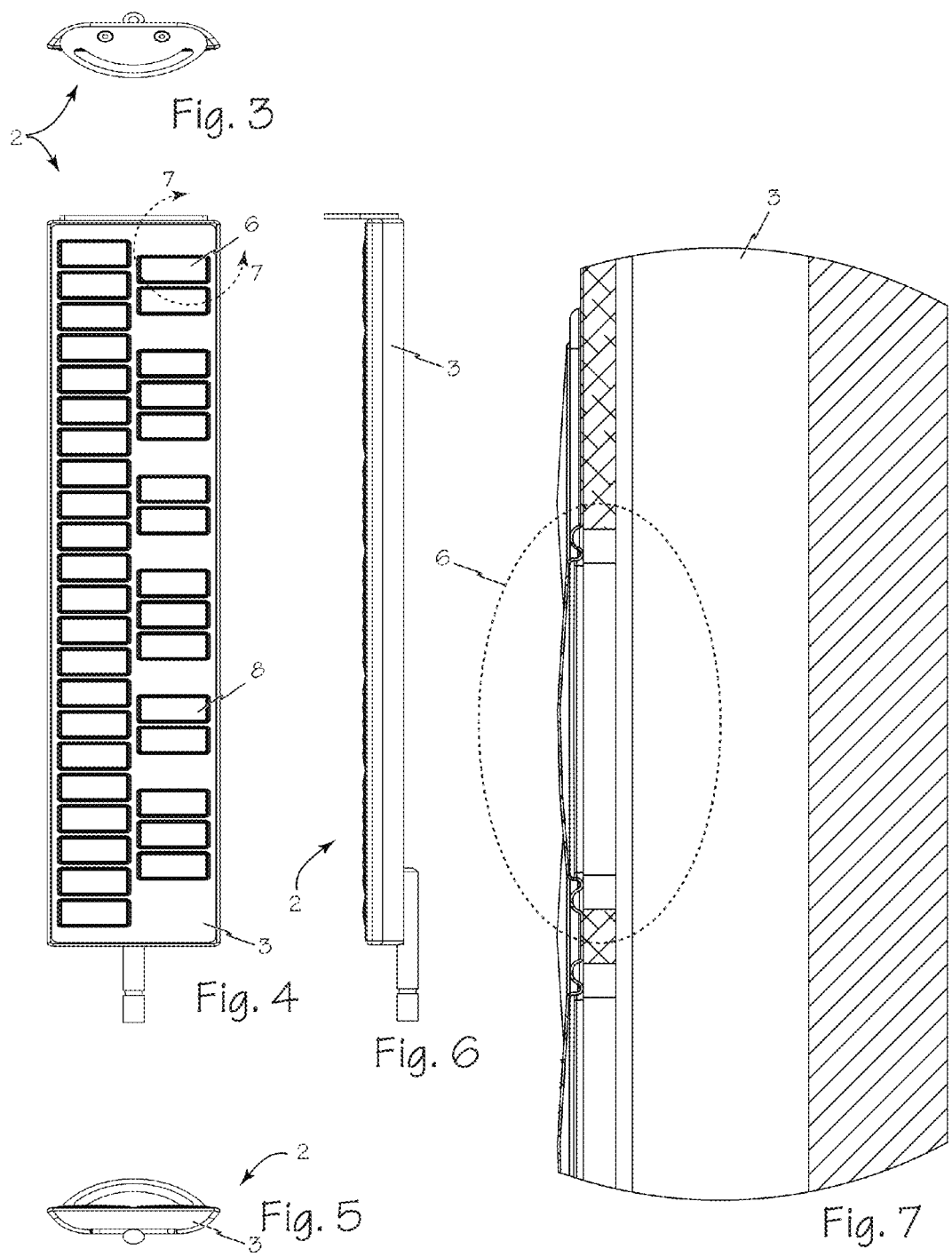

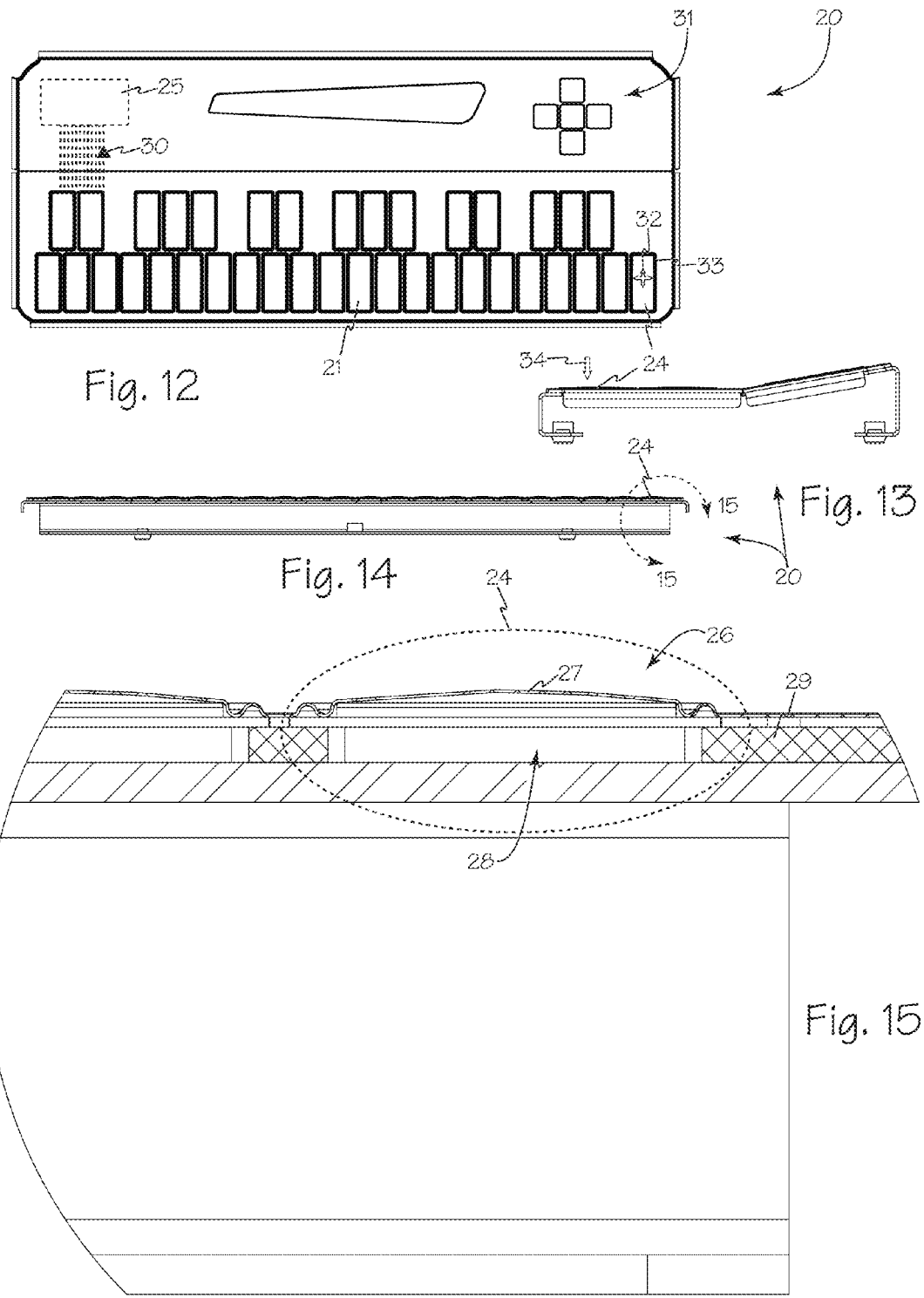

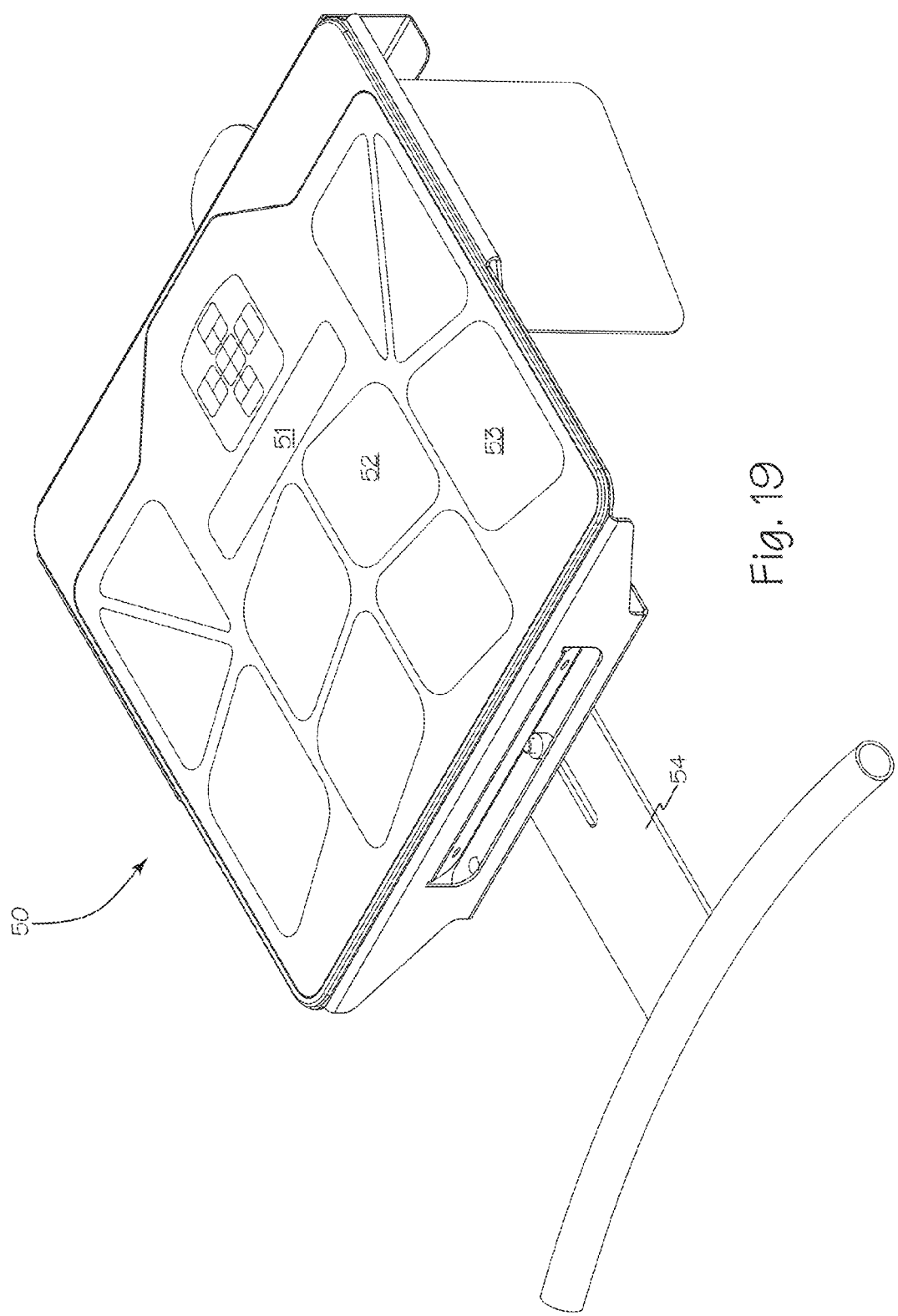

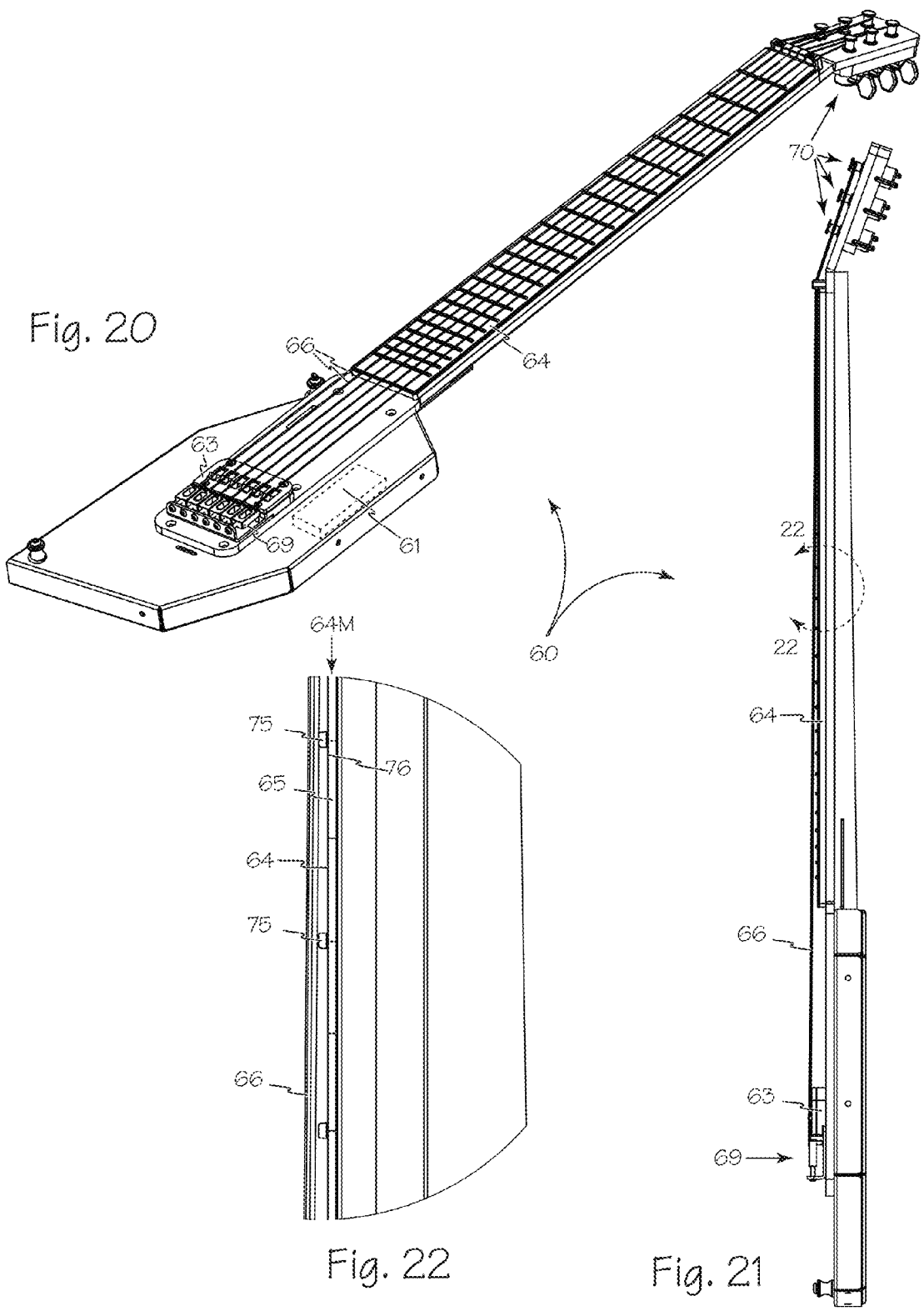

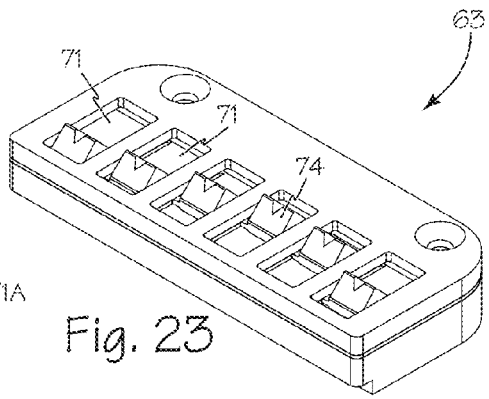
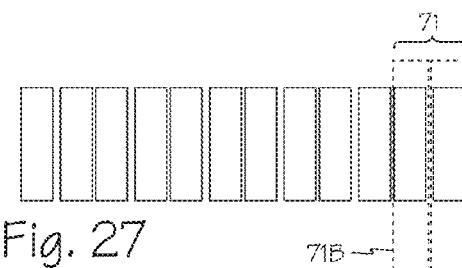
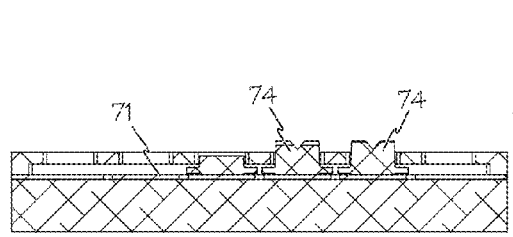
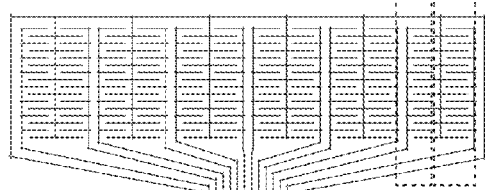
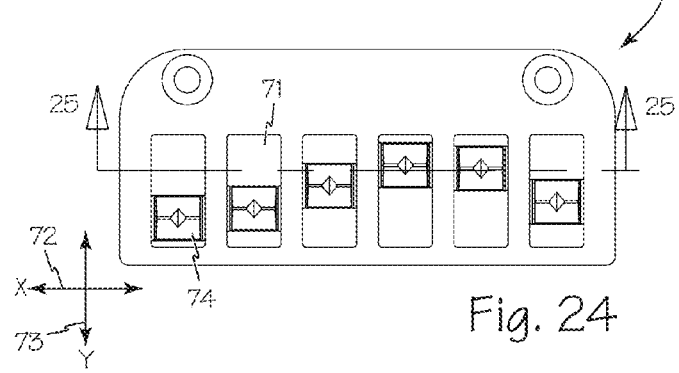
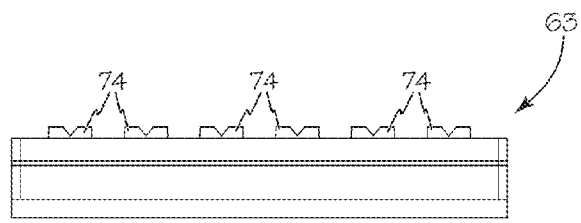

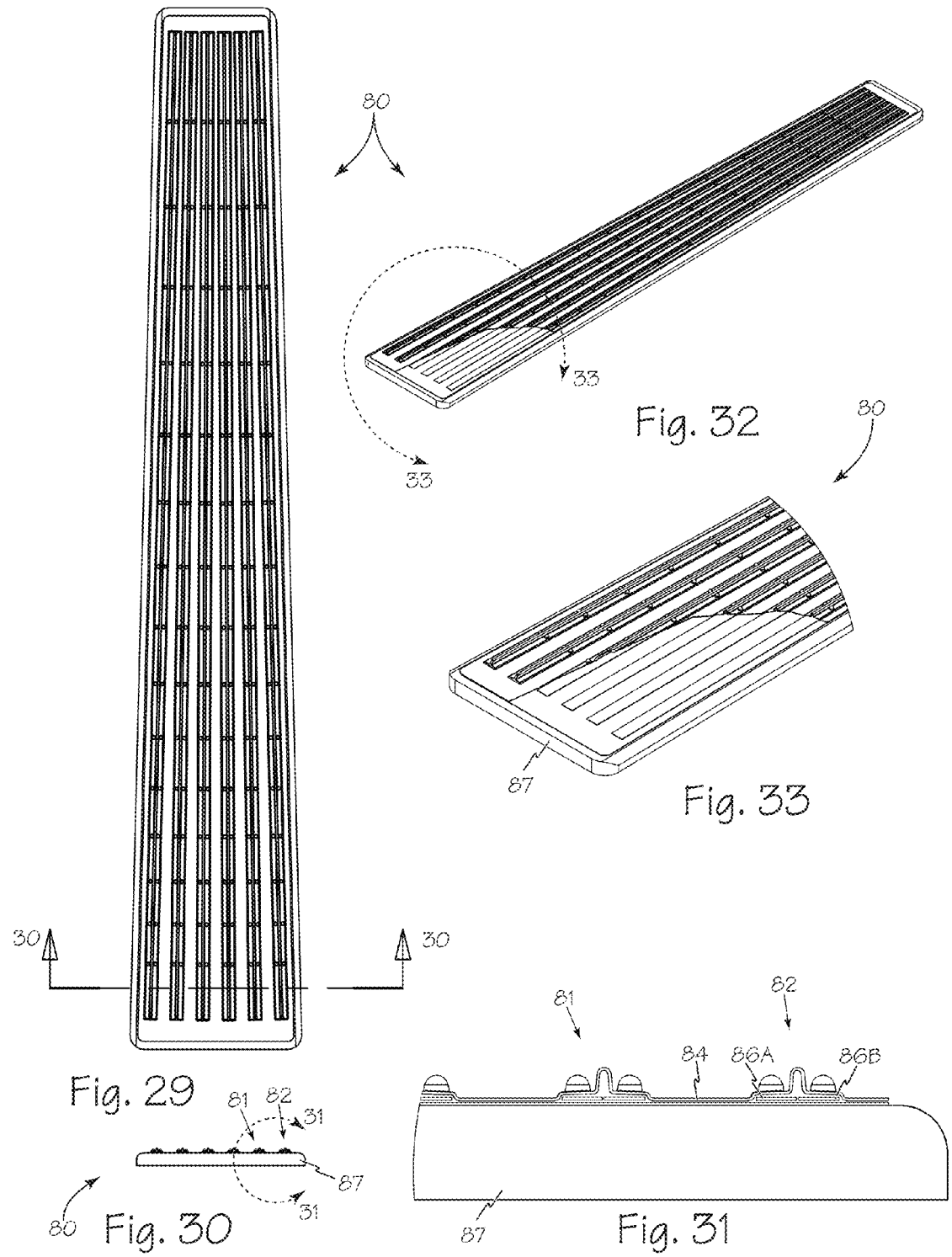

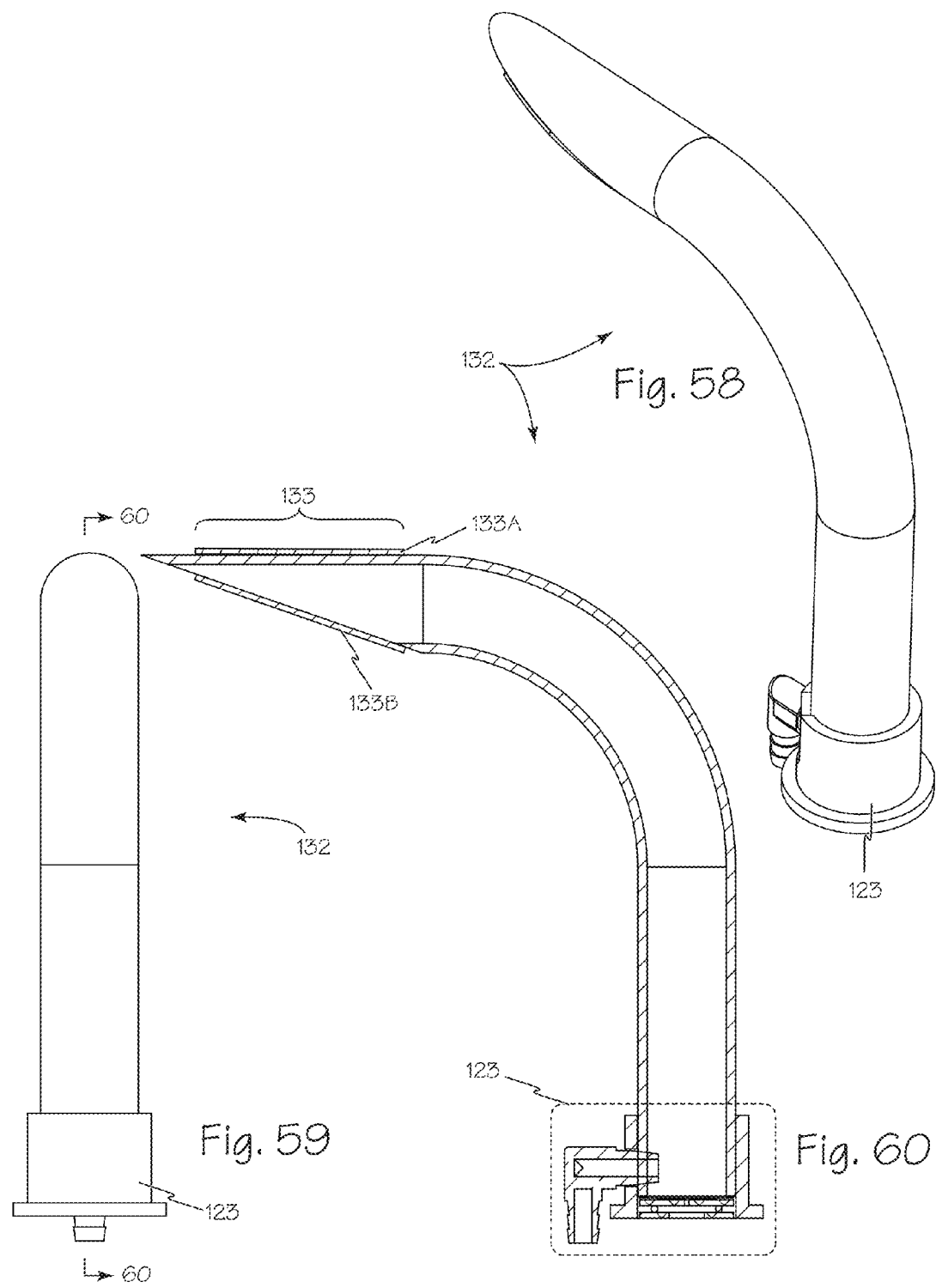

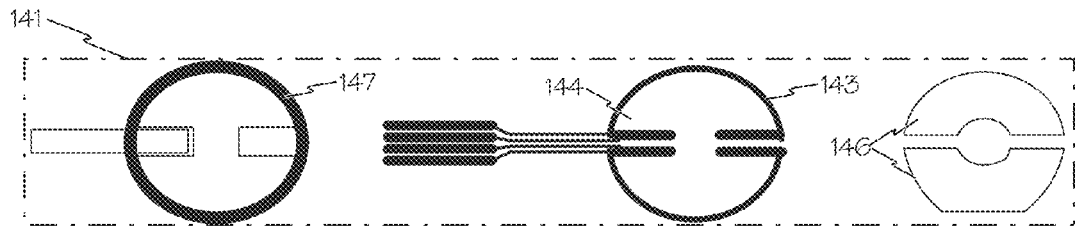
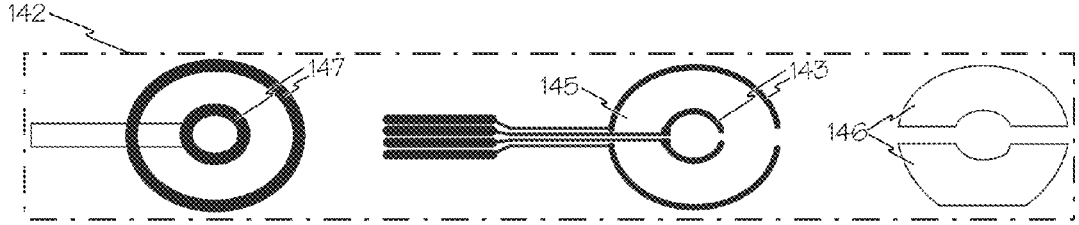
Fig. 65        Fig. 66        Fig. 67
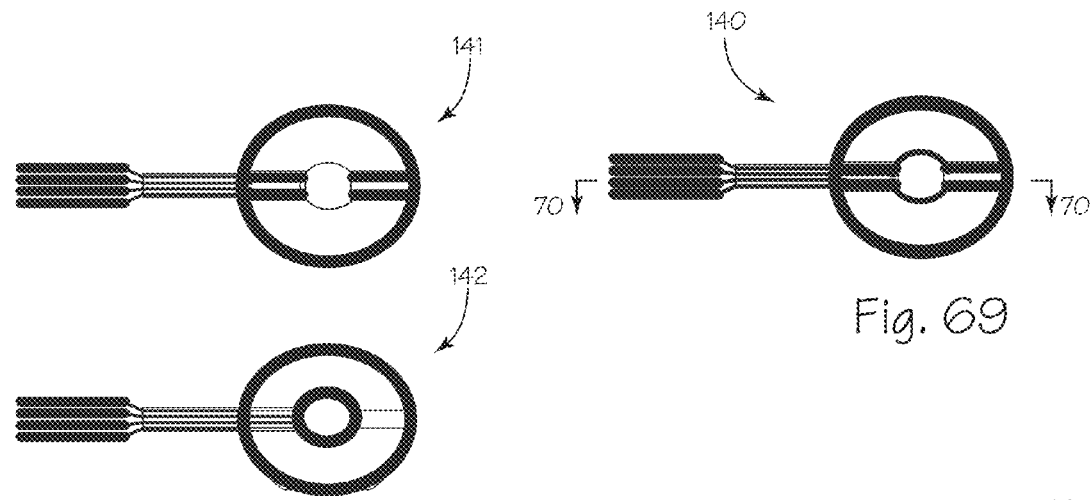
Fig. 68        Fig. 69
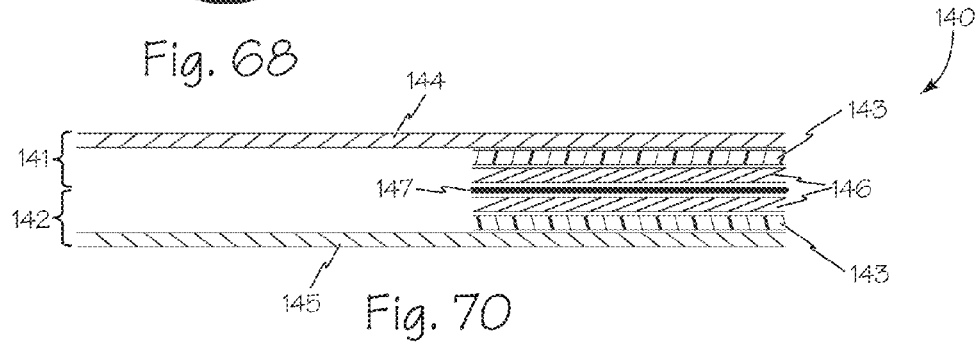
Fig. 70

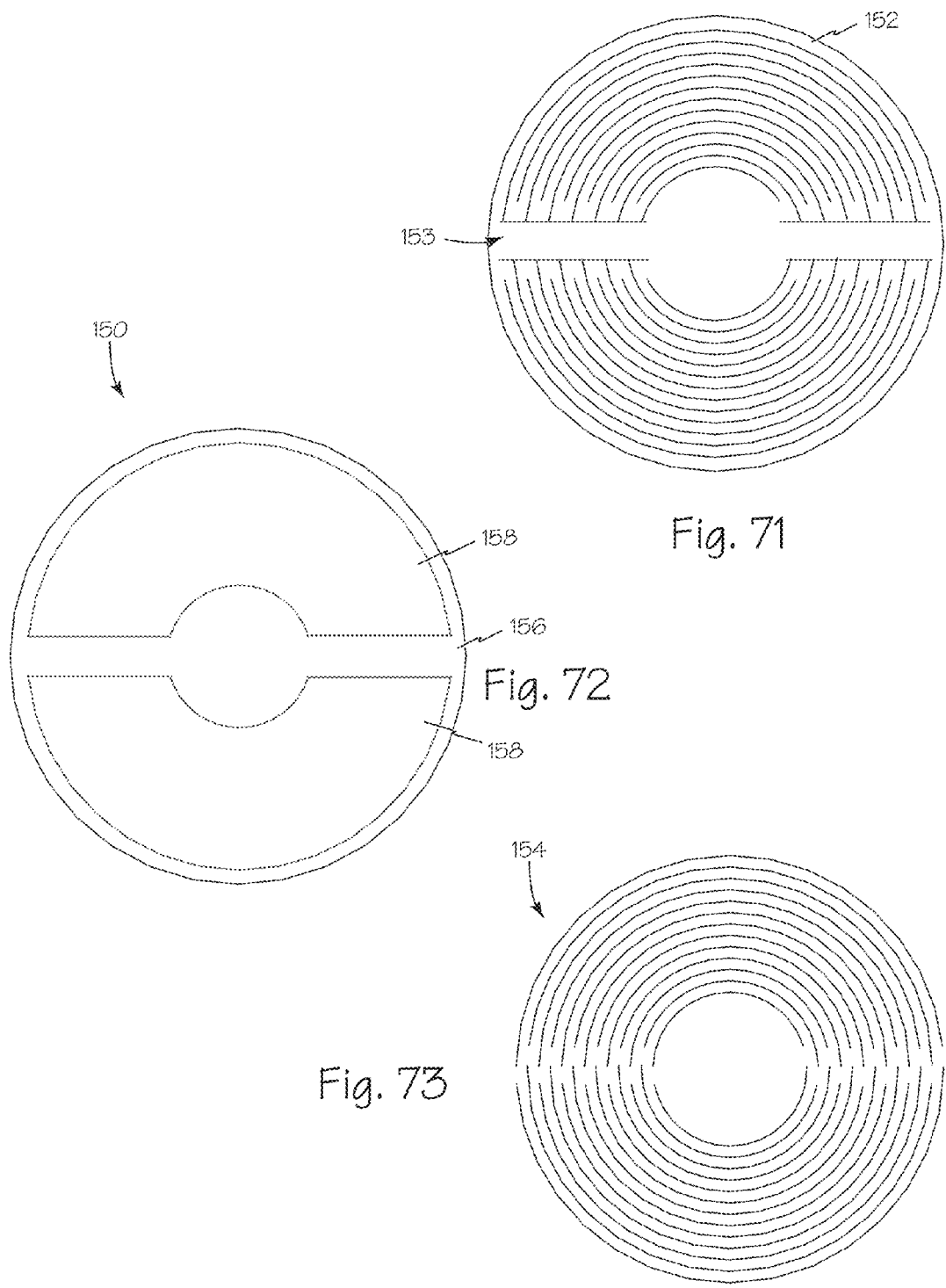

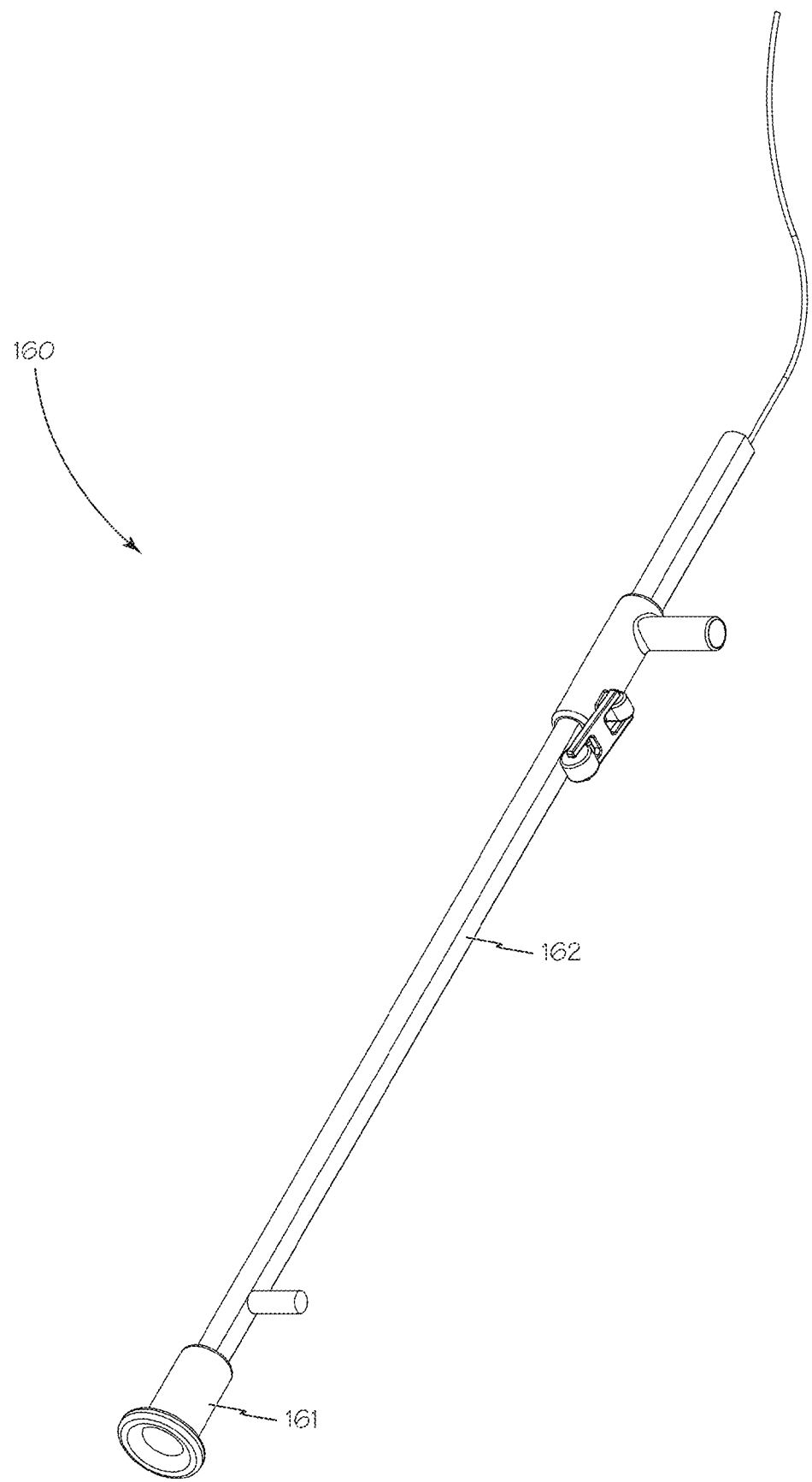

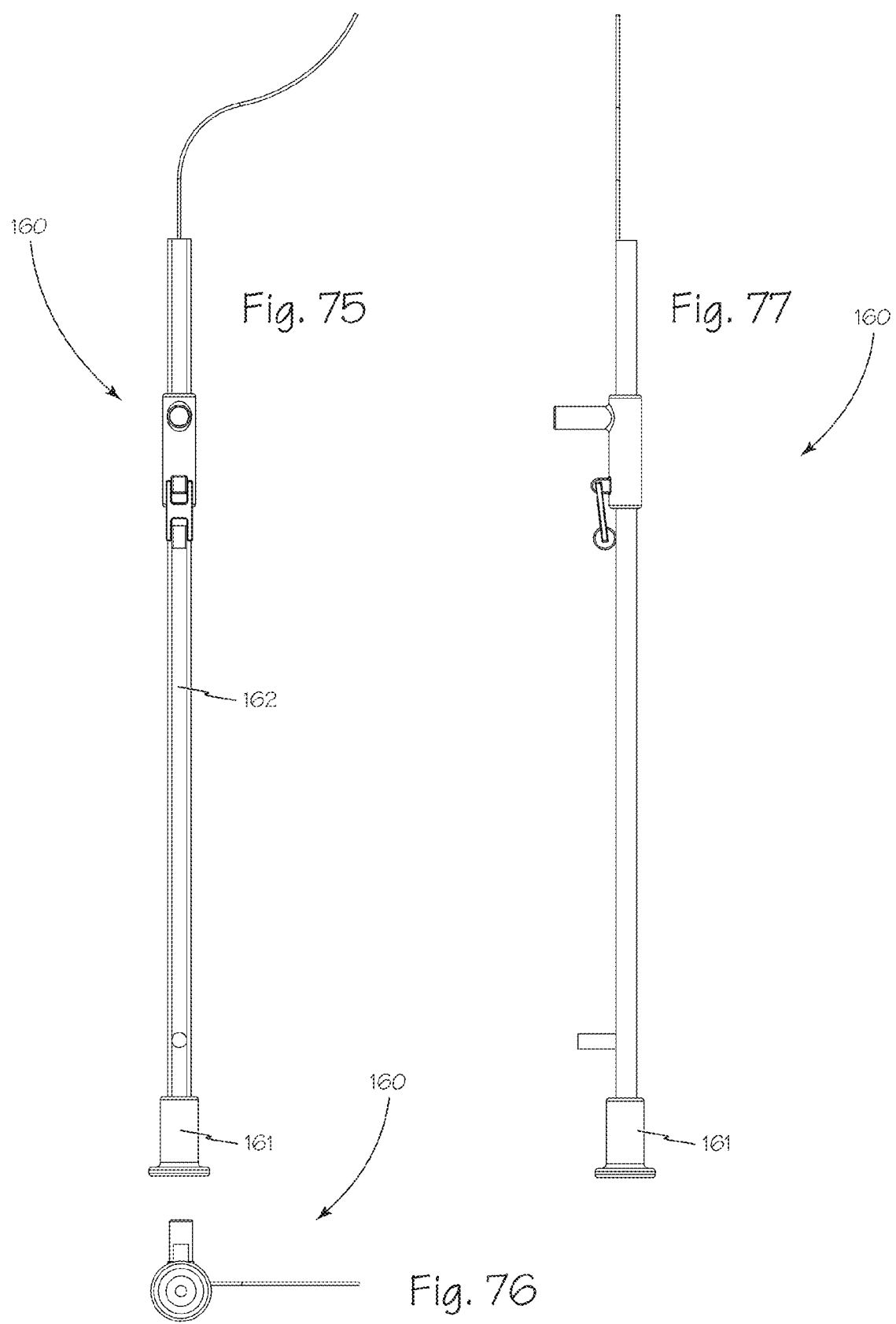

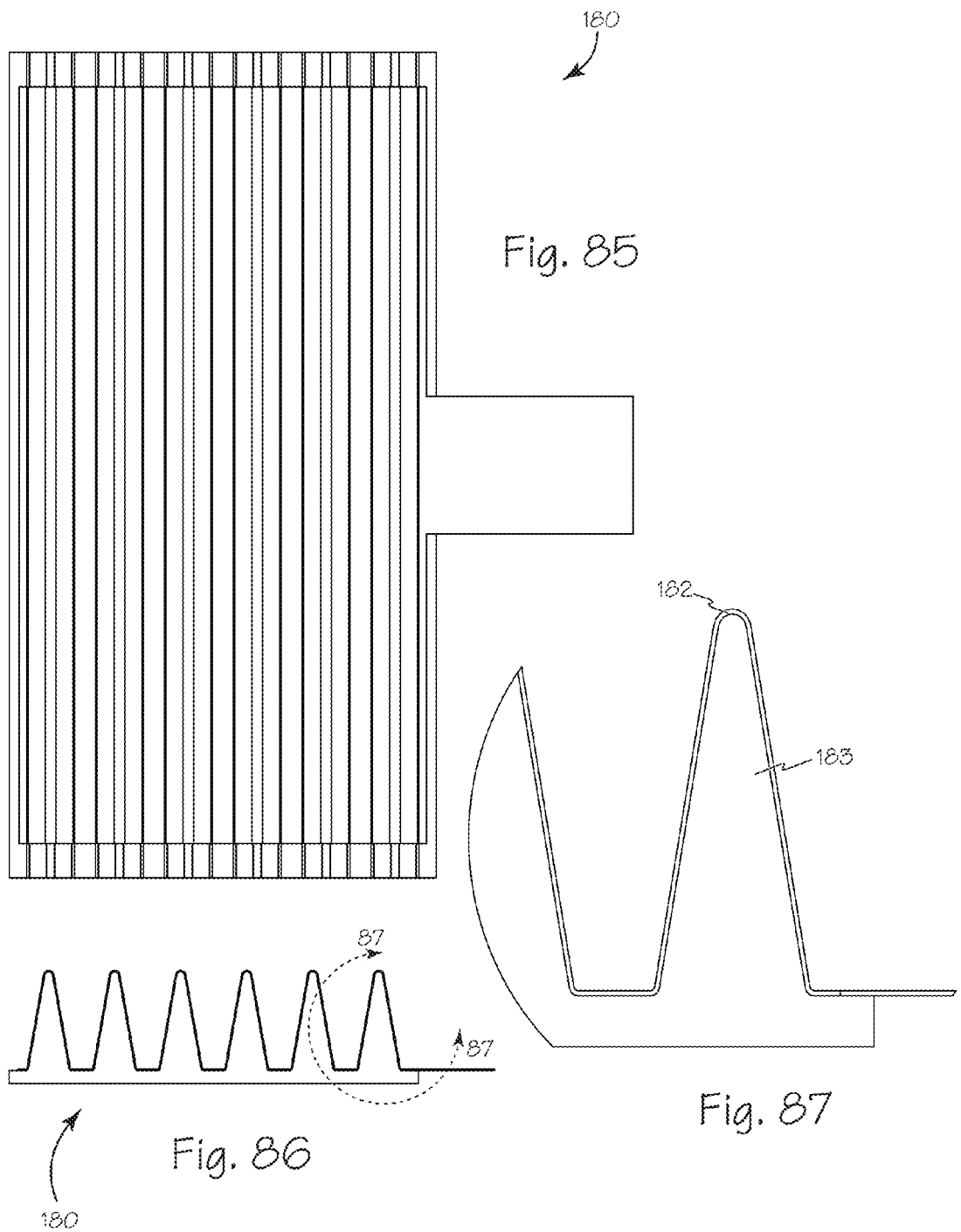

ELECTRONIC MUSICAL INSTRUMENTS USING MOUTHPIECES AND FSR SENSORS

RELATED APPLICATIONS

This application is a continuation of U.S. patent application Ser. No. 14/216,803 filed Mar. 17, 2014, now U.S. Pat. No. 8,987,577 which claims priority from U.S. Provisional Patent Application 61/794,361 filed Mar. 15, 2013.

FIELD OF THE INVENTIONS

The inventions described below relate the field of musical instruments and more specifically to the field of electronic musical instruments with force sensing resistor (FSR) sensors.

BACKGROUND OF THE INVENTIONS

Conventional musical instruments are analog devices and the efforts to digitize instruments have been more ineffective except where the instruments have a key or valve for every different note such as a piano. The available electronic instruments suffer from one-dimensionality owing to the binary nature of their controls. For example, electronic guitars with vanes were divided into a strummer vane device and a neck system that worked together. The most blatant and detrimental feature of this approach was the non-tuned "noise" cause when the strummer vane was released.

SUMMARY

The devices and methods described below provide for Electronic musical instruments with sensors to digitize and alter the sound using force sensing resistor (FSR) sensors in the mouthpieces and other elements of the instrument to mimic the variations available in analog instruments.

An FSR, either ShuntMode or ThruMode with an improved dynamic range may be created by adding a topography or texture to the surface of the conductor. This can be accomplished by both mechanical means as well as with additives to the ink formulation. Application of force to the substrate may generate any suitable texture or topography in the substrate.

Typically, a ShuntMode FSR consists of a substrate printed with highly conductive interdigiting finger trace patterns made of such conductive inks as silver or carbon, which is oriented in apposition to a substrate with FSR element printed and cured upon it. A ThruMode FSR is formed of highly conductive electrodes formed by deposition of inks such as silver or carbon which are deposited on two substrates that are overprinted with FSR elements. The two substrates of a ThruMode FSR are oriented in apposition with the substrates out and the printed FSR elements between the substrates.

The substrate of FSR sensors may be created using a suitable metalized plastic film such as Mylar® (Mylar® is a registered trademarks of DuPont Teijin Films U.S. Limited Partnership). By depositing aluminum on one or more surfaces of a plastic film sheet, large and inexpensive FSR sensors may be created. Plastic film sheets such as Mylar® may also be shaped to form suitable texture or topography in the FSR substrate to improve the dynamic range of the sensor compared to sensors formed with smooth substrates.

BRIEF DESCRIPTION OF THE DRAWINGS

FIG. 1 illustrates a front perspective view of a hybrid electronic guitar/piano.

FIG. 2 illustrates a rear perspective view of the hybrid electronic guitar/piano of FIG. 1.

FIG. 3 is and end view of the keyboard neck of the hybrid electronic guitar/piano of FIG. 1.

FIG. 4 is a top view of the keyboard neck of the hybrid electronic guitar/piano of FIG. 1.

FIG. 5 is an end view of the keyboard neck of the hybrid electronic guitar/piano of FIG. 1.

FIG. 6 is a side view of the keyboard neck of the hybrid electronic guitar/piano of FIG. 1.

FIG. 7 is a close up cross-section of the keyboard neck of FIG. 4 taken along 7-7.

FIG. 12 is a front view of a electronic music keyboard.

FIG. 13 is an end view of the electronic music keyboard of FIG. 12.

FIG. 14 is a side view of the electronic music keyboard of FIG. 12.

FIG. 15 is close up cross-section of the keyboard of FIG. 14 taken along 15-15.

FIG. 19 illustrates an electronic drum.

FIG. 20 is a perspective view of an electronic guitar.

FIG. 21 is a side view of the electronic guitar of FIG. 20.

FIG. 22 is a close-up view of a portion of the neck of the electronic guitar of FIG. 21 taken along 22-22.

FIG. 23 is a perspective view of an FSR rocking bridge for the electronic guitar of FIG. 20.

FIG. 24 is a front view of the rocking bridge of FIG. 23.

FIG. 25 is a close up cross-section view of the rocking bridge of FIG. 22 taken along 25-25.

FIG. 26 is an end view of the rocking bridge of FIG. 23.

FIG. 27 is a front view of the FSR pads for the rocking bridge of FIG. 23.

FIG. 28 is a front view of the conductor traces for the rocking bridge of FIG. 23.

FIG. 29 is a front view of a continuous string simulator for a electronic guitar.

FIG. 30 is an end view of the FSR continuous string simulator of FIG. 29.

FIG. 31 is a close-up view of a portion of the FSR continuous string simulator view of FIG. 30 taken along 31-31.

FIG. 32 is a perspective view of the FSR continuous string simulator of FIG. 30.

FIG. 33 is a close-up view of a portion of the FSR continuous string simulator view of FIG. 32 taken along 33-33.

FIG. 58 is a perspective view of a saxophone style mouthpiece for the electronic wind instrument of FIG. 52.

FIG. 59 is a front view of the mouthpiece of FIG. 58.

FIG. 60 is a cross-section view of the mouthpiece of FIG. 59 taken along 60-60.

FIG. 65 is a front view of dielectric layers for the X and Y thru mode circuits of the mouthpiece of FIG. 61.

FIG. 66 is a front view of conductor layers for the X and Y thru mode circuits of the mouthpiece of FIG. 61.

FIG. 67 is a front view of FSR layers for the X and Y thru mode circuits of the mouthpiece of FIG. 61.

FIG. 68 is a front view of compiled layers for the X and Y thru mode circuits of the mouthpiece of FIG. 61.

FIG. 69 is a front view of assembled layers for the thru mode sensor for the mouthpiece of FIG. 61.

FIG. 70 is a cross section of the assembled thru mode sensor of FIG. 69 taken along 70-70.

FIG. 71 is a front view of the conductors for a shunt mode sensor for the mouthpiece of FIG. 61.

FIG. 72 is a front view of the resistor shunt layer for a shunt mode sensor for the mouthpiece of FIG. 61.

FIG. 73 is an alternate conductor layout for a shunt mode sensor for the mouthpiece of FIG. 61.

FIG. 74 is a perspective view of a electronic trombone.

FIG. 75 is a front view of the electronic trombone of FIG. 74.

FIG. 76 is an end view of the electronic trombone of FIG. 74.

FIG. 77 is a side view of the electronic trombone of FIG. 74.

FIG. 85 is a front view of the alternate FSR fretboard of FIG. 84.

FIG. 86 is an end view of the alternate FSR fretboard of FIG. 84.

FIG. 87 is a close-up cross section of a portion of the alternate FSR fretboard of FIG. 86 taken along 87-87.

DETAILED DESCRIPTION OF THE INVENTIONS

Figure 8:
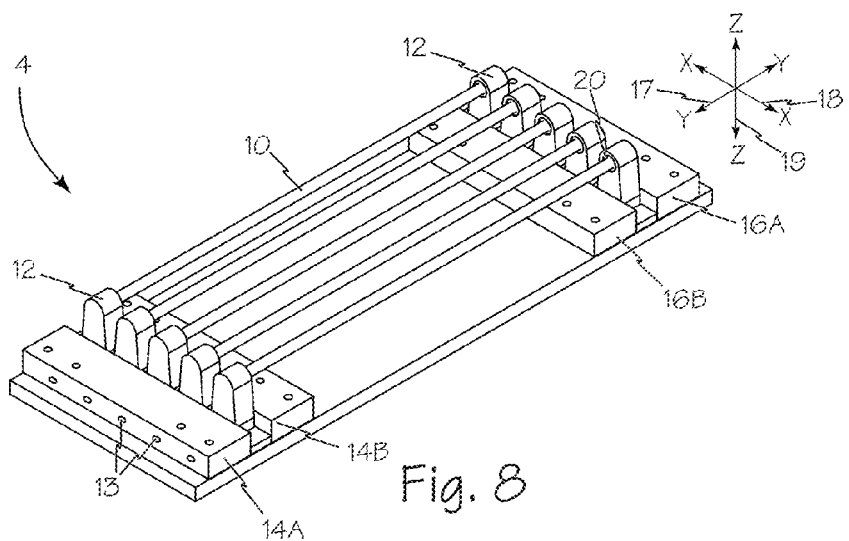
FIG. 8 is a perspective view of the strum rods of the hybrid electronic guitar/piano of FIG. 1.
Figure 9:
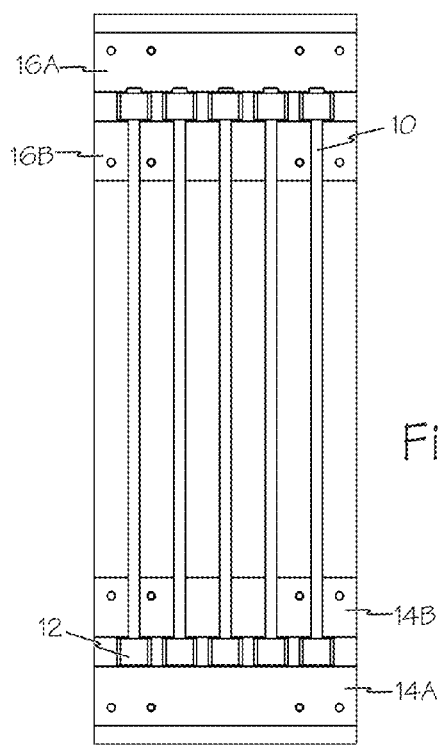
FIG. 9 is a front view of the strum rods of the hybrid electronic guitar/piano of FIG. 1.
Figure 11:
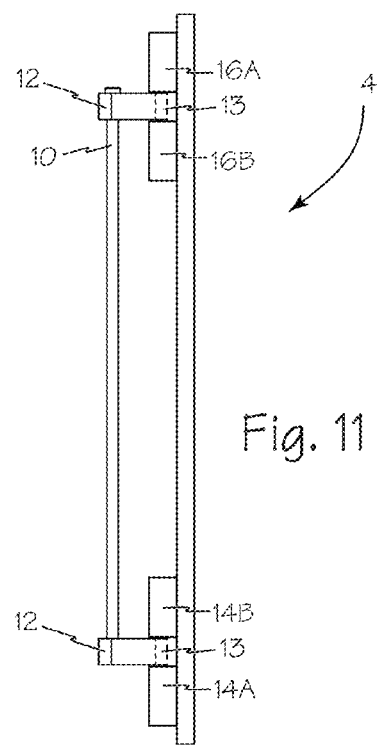
FIG. 11 is a side view of the strum rods of the hybrid electronic guitar/piano of FIG. 1.
Figure 10:
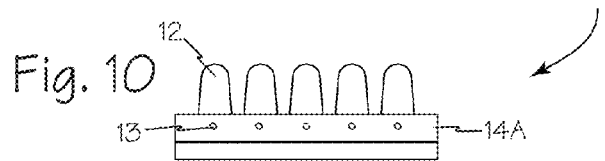
FIG. 10 is and end view of the strum rods of the hybrid electronic guitar/piano of FIG. 1.

The Guitano, electronic instrument 1 of FIGS. 1-11 includes a 3 octave range, piano-like keyboard 2 incorporated into a guitar-style neck 3 with two or more guitar-like strum-rods in strum rod assembly 4 on body 5 of the instrument. There are two types of keys that may be used. The first key, pressure key 8, measures only force applied to each key. Second key, FSR key 6 measures contact in 3-axes, X-axis 18, Y-axis 17 and Z-axis 19, or position and force sensing using trampoline keys such as key 6 on the neck. The 3-axis FSR sensors in the keys determine exact location and force of the fingers. The keys respond to the user's touch inflections allowing for expression of effects like vibrato, note bending or cross fading voices, as well as determining the volume of a note. User input keys such as key 7 are used to set up how the keys respond to position/force information and how the Strum-rods are used.

Referring now to FIG. 8, each strum-rod such as strum-rod 10 is supported by rocker towers 12 which are pivotally supported by pivot pins 13 in first pivot blocks 14A and 14B along with second pivot blocks 16A and 16B. Depending which end of the strum-rod is strummed, along y-axis 17, and which direction the force is applied to the strum-rod, along x-axis 18 and z-axis 19, will control the performance of the instrument.

The user determines how a note is played using either key mode, strum mode or a combination of both modes simultaneously. In the key mode, electronic instrument 1 operates as a regular keyboard that is mounted on a guitar-style body. In key mode a note is sounded when the key is activated or struck and strum-rod assembly 4 can be used to modify the note that has already been sounded. The strum-rods trigger and control the volume of whatever notes are pressed on the neck. In strum mode, a note is sounded only after a strum-rod is released and depends on the strum-rod or rods that are strummed. In "Both" mode the keys sound off immediately but will repeat when every time the strum-rods are activated.

Depending on the user settings, the strum-rods can produce different notes and effects. For example, operating one strum-rod could produce only the note[s] pressed on the keyboard neck but operating two or more strum-rods might produce the notes pressed on the neck as well as their fifths or octaves, allowing a chord to be made out of one key and a few strummers being operated or strummed. Also, resting your hand on the strummer could act as a mute, adding to the expressive capabilities. Mute collars 15 may be included between the strum rods and the rocker towers to optimize the mute capabilities of the instrument. Mute collars 15 may be made of rubber, polymers or any other suitable materials.

Another possible use of strum-rod assembly 4 is: one note on the neck will product five octaves of that note, two notes held on the neck will produce those two notes in two octaves, three notes on the neck could product the three notes held down with the root note in octaves, four notes held down will produce four notes and octave, and five notes down will produce five notes.

Keyboard instrument 20 of FIGS. 12 through 15 is a musical instrument that functions as a regular keyboard but with greater responsiveness and expressive capabilities. There are two versions; one simply senses the amount of force applied to each key such as key 21 to determine amplitude of the note. Alternatively, keys such as FSR key 24 may be equipped with 3-axis sensors to allow the instrument to detect exact position and force applied to each individual key. Sliding up and down on a key such as FSR key 24 may produce various effects such as cross-fading between two different music voice sets, while rocking side to side could act as a wah-wah or other effect. The pressure applied to keys such as key FSR 24 may be used to control the amplitude of the note produced.

Keyboard instrument 20 includes a microprocessor 25 to interpret each note as force is applied to a key. The note's sustain may take different characteristics based on how the key is manipulated after force is first applied.

Each 3-axis key such as FSR key 24 can be a single entry XYZ pad and features a trampoline sensor 26 illustrated in FIGS. 15 through 18. Trampoline sensor 26 increases the travel of switch/sensor layers 27 and minimizes the hard feel at the end of travel. A trampoline sensor achieves this with an opening 28 in rigid substrate 29 that outlines the shape of the switch/sensor.

Key position signals such as signal 30 corresponding to the position and force applied each key are applied to microprocessor 25. Microprocessor 25 receives and interprets key position signals such as signal 30. Position and force sensing element within a key may be configured to operate as a linear pot which can be assigned such parameters as note bend and pass that value to microprocessor 25. A body brace and neck strap may be included to support any of the disclosed electronic instruments, such as keyboard 20, in place while the operator is dancing with the music. Control Parameters may be configured with—Up/down—Right/Left—Enter—touch sensing user input keys 31 to change any program parameters like voice or key functions.

Keyboard instrument 20 functions most simply as a typical keyboard, but with many expanded options. The XYZ sensing capacity of each key can interpret finger movement 32 within perimeter 33 of each key to allow for greater expression such as vibrato or pitch bend for each individual key while applied force 34 can be read to interpret the volume of a note. The linear pot configuration may be used as a "ribbon controller" and assigned any input for functions like global pitch bend or EQ shifting. The Up/down—right/left—Enter function keys are FSR keys and are used to change the any function such as how keys respond to finger position, assignment to the linear pot, as well as changing the voice of the instrument.

Keyboard instrument 20 may also be configured with FSR sensors formed as a matrix array. A first substrate includes many parallel conductors with an resistive layer deposited on the conductors. A second substrate includes many parallel conductors with an resistive layer deposited on the conductors. The first substrate is oriented in apposition to the second substrate with the conductors of the first substrate perpendicular to the conductors of the second substrate. Application of a force to any point of the properly oriented layers results in signals from the conductors on the first substrate and the second substrate corresponding to the point the force was applied with the signal level corresponding to the intensity of the force applied.

FSR sensors benefit from a trampoline configuration such as illustrated in FIGS. 15, 16, 17 and 18. Force sensor 26 is formed with two parallel substrates such as first and second substrates 27A and 27B. Each substrate may be planar or may be shaped to form one or more flexible sections such as shaped sections 38A and 38B to optimize sensor movement along the z-axis. Each substrate contains one or more FSR elements, such as conductive deposits and or traces 40A and 40B respectively, to form a force sensing resistor to quantify the location and intensity of force, such as force 34 applied to the active area within perimeter 33 of each key sensor. Sensor support or substrate includes openings such as opening 28 sized and dimensioned to correspond to the active area within perimeter 33 of the force sensor 26.

FSR sensor 26 may be formed with the force sensing elements on each substrate, 40A and 40B respectively, oriented in apposition to provide one or more different active areas or a single active area corresponding to the area within perimeter 33.

Figure 16:
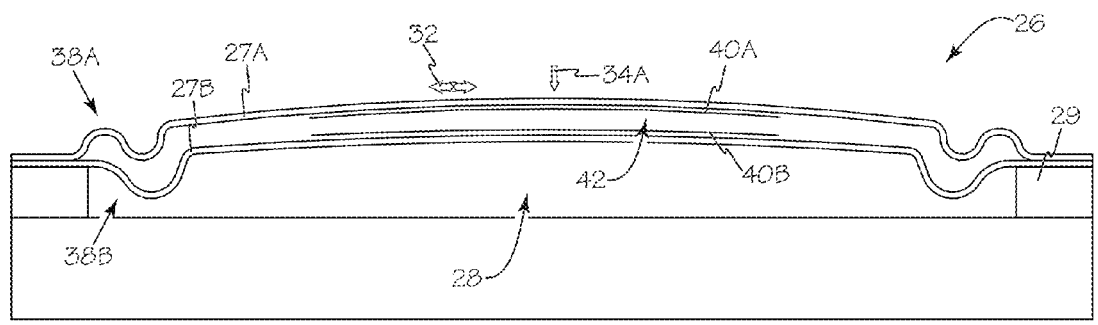
FIG. 16 is close up cross-section view of an un-actuated FSR button on any of the disclosed electronic instruments.
Figure 17:
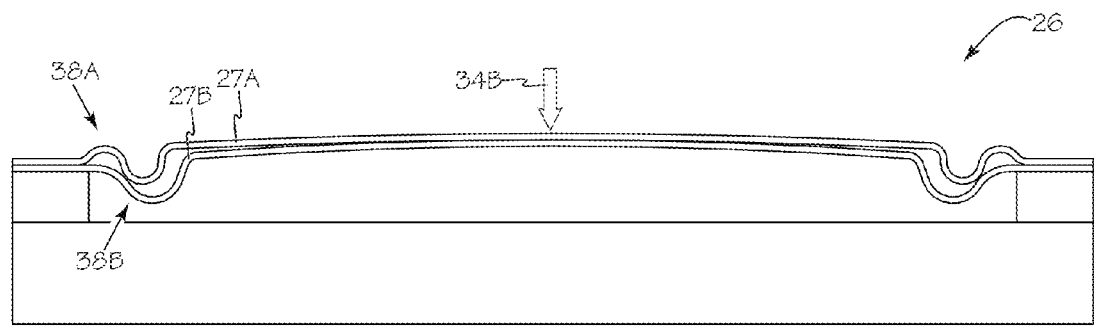
FIG. 17 is close up cross-section view of a lightly actuated FSR button on any of the disclosed electronic instruments.
Figure 18:
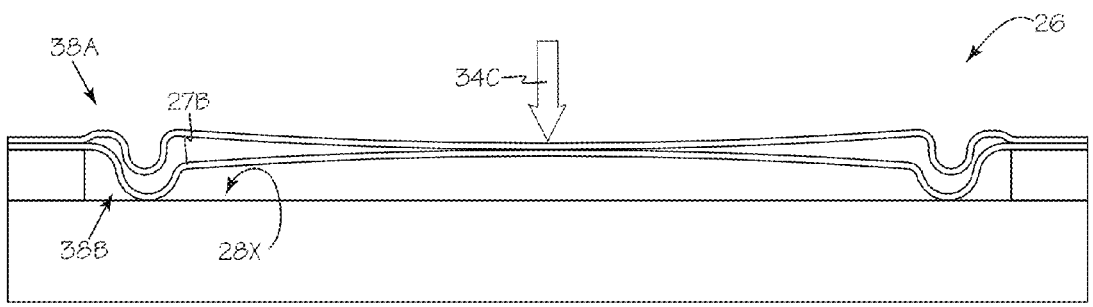
FIG. 18 is close up cross-section view of a fully actuated FSR button on any of the disclosed electronic instruments.

FSR sensor 26 of FIG. 16 is experiencing minimal z-axis force 34A. As z-axis force 34B increases as illustrated in FIG. 17, shaped section 38A flexes more that shaped section 38B bringing first and second FSR conductive layers 40A and 40B into contact initiating a measurable response from sensor 26. As the intensity of z-axis force 34C increases as illustrated in FIG. 18, shaped section 38B contacts lower surface 28 of the substrate opening. In fully depressed mode as illustrated in FIG. 18, first and second FSR conductive layers 40A and 40B are in full contact and a correspondingly low resistance between the conductive layers.

An FSR sensor may be configured as either ShuntMode or ThruMode with an improved dynamic range may be created by adding a topography or texture to the surface of the conductor. This can be accomplished by both mechanically forming texture or topography on the substrate as well as with additives to the ink formulation. Any suitable texture or topography in the substrate will produce improvements in dynamic response compared to a smooth substrate. Using metallized plastic film sheets as a substrate, substrate 27A, with a coating 40A formed of deposited aluminum instead of silver or other expensive conductor enables production of inexpensive FRSs in volume. Texture may be applied to a substrate such as substrate 27A by pressing the uncoated plastic sheet substrate with, for example, sandpaper. The irregularities in the surface of the sandpaper transfer to the substrate and after deposition of the aluminum conductor, the conductor contact surface 41 includes sufficient surface irregularities to operate as an FSR sensor with a high dynamic response.

Typically, a ShuntMode FSR consists of a substrate printed with highly conductive interdigiting finger trace patterns made of such conductive inks as silver or carbon, which is oriented in apposition to a substrate with FSR element printed and cured upon it. Or in the case of the ThruMode, highly conductive electrodes of such inks as silver or carbon are deposited on both substrates that are overprinted with FSR elements. The silver conductive inks demonstrate more "standoff" and dynamic range than the carbon conductor due to the topography caused by the silver flakes and lack of topography of the micro carbon particles.

An experiment was performed comparing the resistance characteristics of the FSR before and after adding texture or topography to the plastic substrate. In the case of the ShuntMode, either of the substrates with the conductive fingers or the substrate with the FSR could be textures for the desired results. For the ThruMode construction, to minimize the topography of conductive base inks like silver or carbon that have a surface topography when printed, metalized Mylar® was used because the vacuum deposited aluminum surface was relatively flat. Adding roughness to the substrate increased the dynamic range, increased the FSR resistance at any given amount of force, and increased the standoff (minimum force required to begin actuation).

Figure 18X:
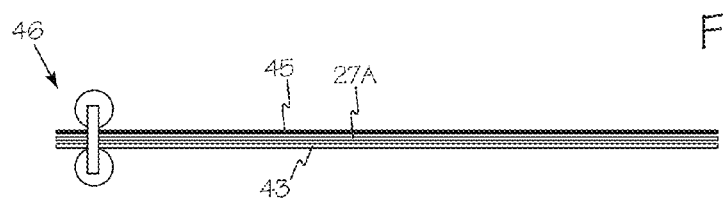
FIG. 18X is close up cross-section view of the components oriented for forming texture in a plastic film substrate.
Figure 34:
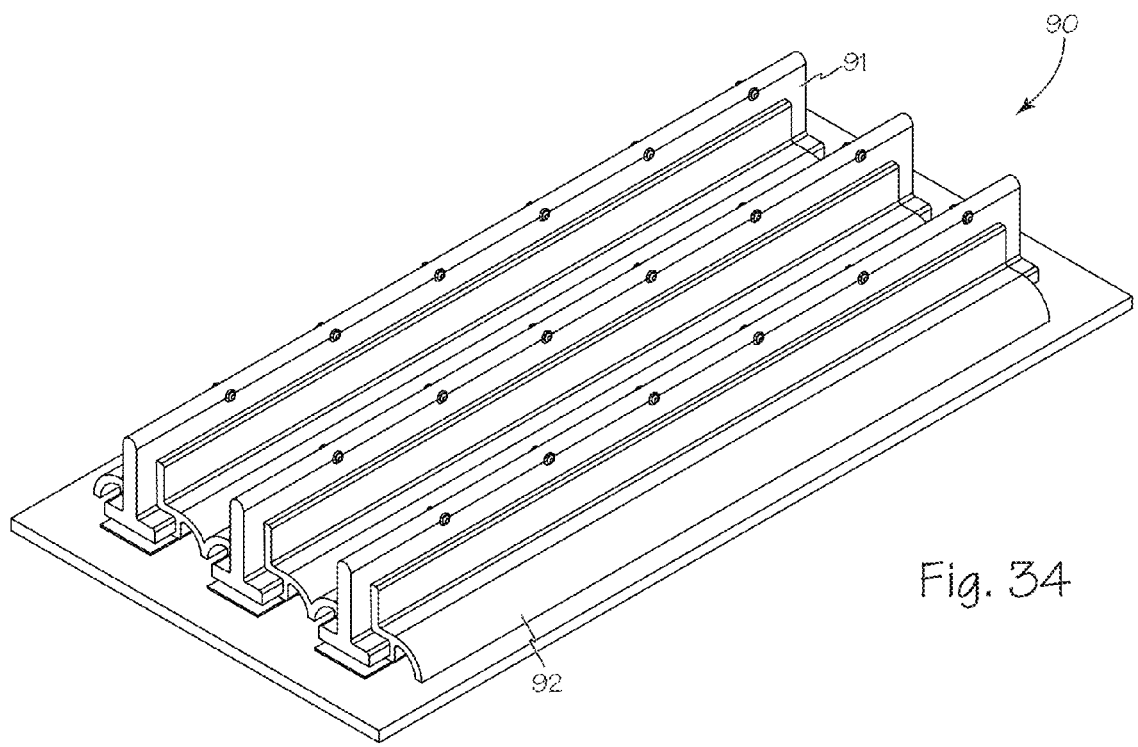
FIG. 34 is a perspective view of an alternate continuous string simulator for electronic string instruments.
Figure 35:
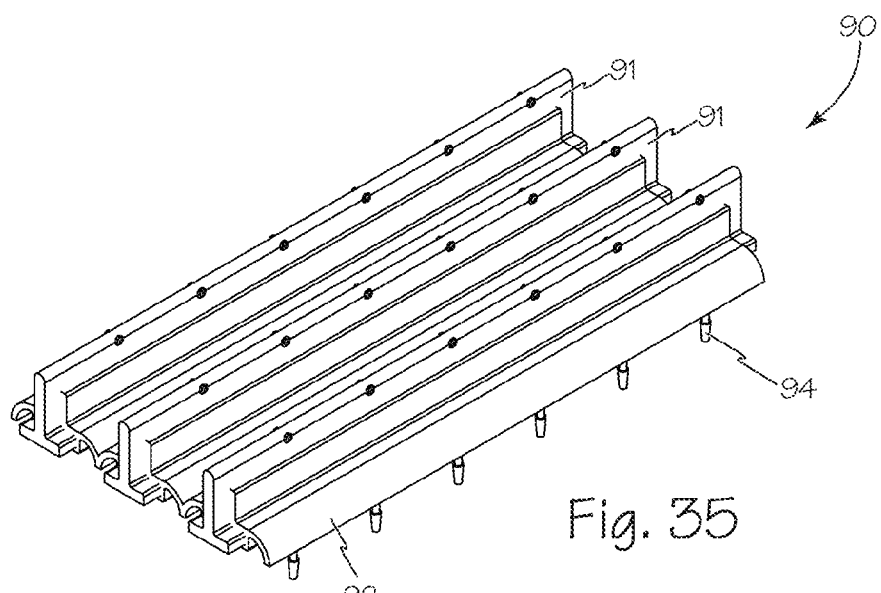
FIG. 35 is a perspective view of the suspension system and vanes for the continuous string simulator of FIG. 34.
Figure 36:
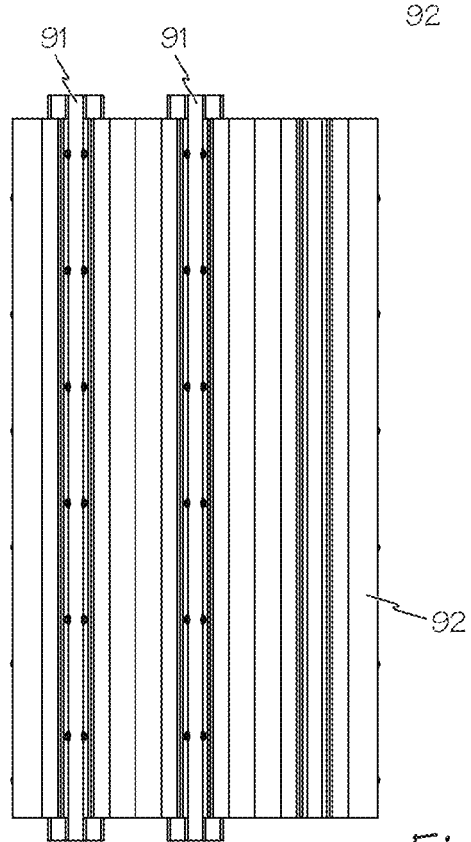
FIG. 36 is a front view of the suspension system and vanes for the continuous string simulator of FIG. 34.
Figure 38:
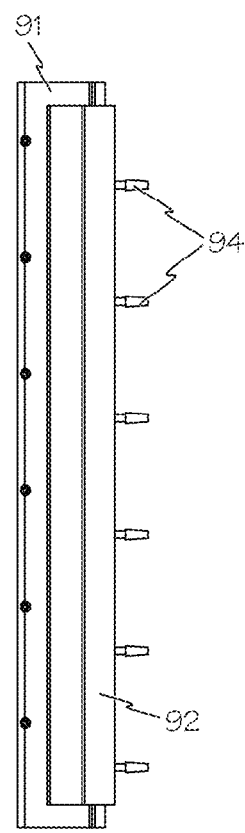
FIG. 38 is a side view of the suspension system and vanes for the continuous string simulator of FIG. 34.
Figure 37:
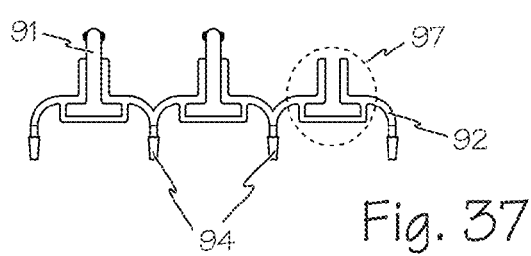
FIG. 37 is an end view of the suspension system and vanes for the continuous string simulator of FIG. 34.
Figure 39:
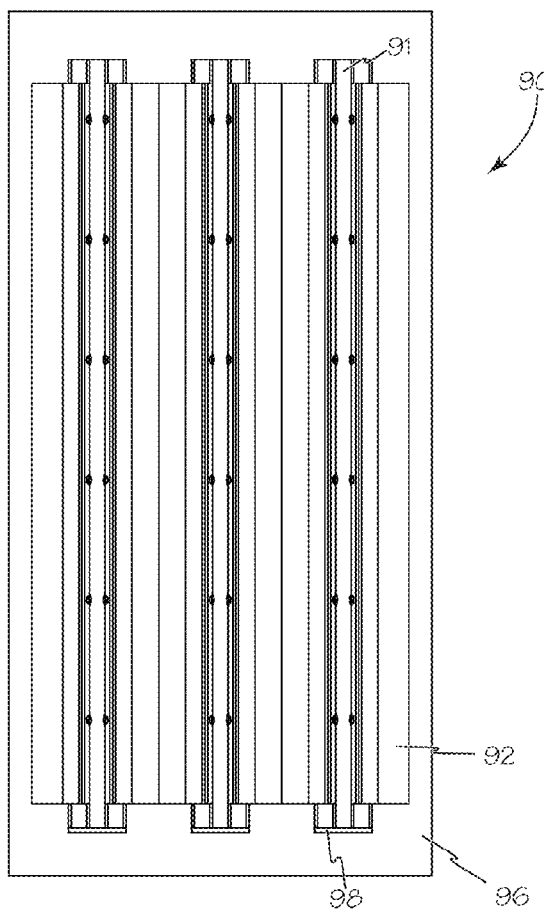
FIG. 39 is a front view of the continuous string simulator of FIG. 34.
Figure 40:
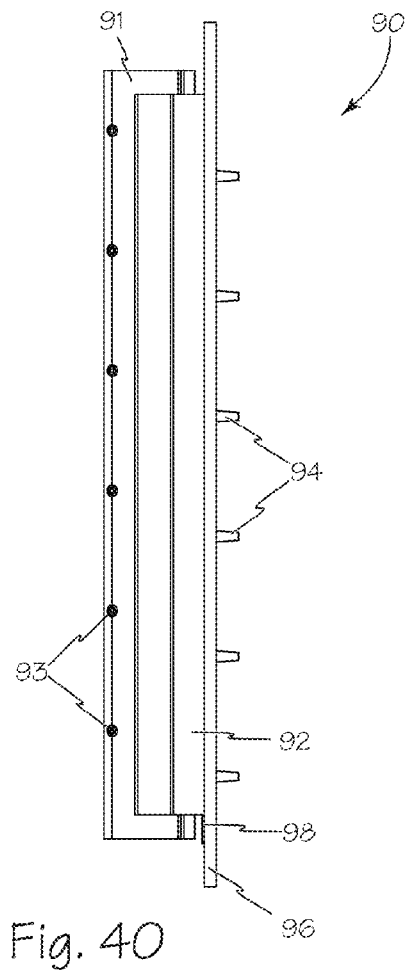
FIG. 40 is a side view of the continuous string simulator of FIG. 39.
Figure 41:
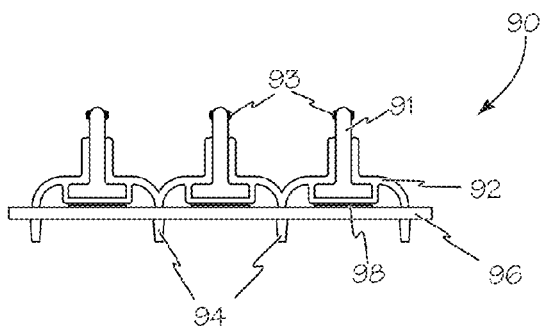
FIG. 41 is an end view of the continuous string simulator of FIG. 39.
Figure 42:
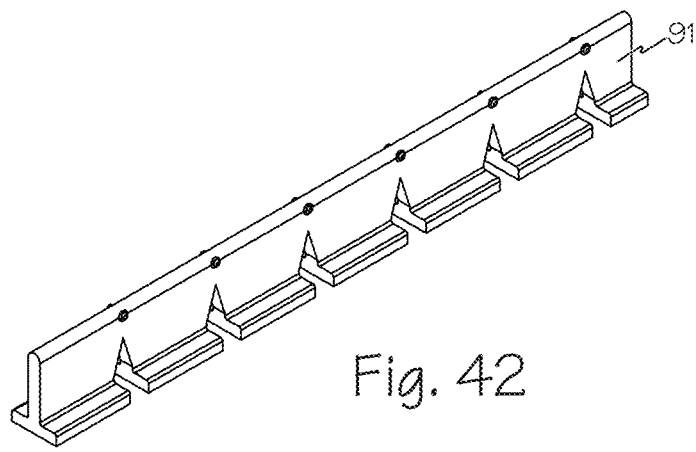
FIG. 42 is a perspective view of a vane for the continuous string simulator of FIG. 34.
Figure 43:
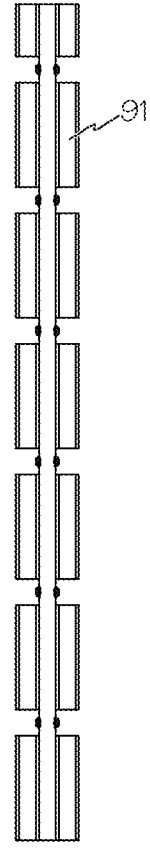
FIG. 43 is a front view of a vane for the continuous string simulator of FIG. 34.

A rough texture/topography may be formed in a plastic film substrate in the process illustrated in FIG. 18X. The plastic film substrate such as substrate 27A or 27B is sandwiched between a sheet of sandpaper 43 and a sheet of rubber 45. Pressure is applied to the sandpaper with adjustable roller nips 46. As a result, the sand particles 43X of sandpaper 43 create indentations in one surface of the plastic film substrate, and tiny raised bumps on the other surface of the plastic film substrate. Alternatively, the desired texture/topography may be etched into a suitable roller which may be used to impress the desired texture/topography into the plastic film substrate.

The changes in the FSR performance characteristics are a result of a micro points of contact between the FSR (either ShuntMode or ThruMode) sheet and the mating substrate caused by the topography or bumps on the surface of the substrate. As a result, a higher amount of force is required to bring the surfaces into contact, and a higher amount of force is required to produce equivalent levels of resistance.

It has been observed that the dynamic range of the sensor is affected if the substrate is textured by mechanical means before or after the FSR element is printed and cured. The graph shows a control part, a part with the FSR printed over a textured surface, and texturing the surface after the FSR element is printed and cured. Printing first and then texturing yields more dramatic dynamic range. Also, when the surface is textured after the FSR is printed and cured, the tips of the raised FSR forms actually stretch the FSR element making the tips more resistive thereby increasing the dynamic range and adding more linearity to the initial contact. This is a desired feature, to minimize the rapid or sharp response or quick knee of the curve with additional linearization as initial force is applied.

Alternatively, a semi-conductive additive such as silicon carbide or iron oxide particles of particular sizes are added to the FSR ink causing raised particles. Spherical semi-conductive or dielectric micro particles of controlled sizes have been found to contribute in achieving desired linearity and other force/resistance curve control parameters. When cured the particles stand proud of the base ink causing multiple micro peaks in the FSR element. The changes in the FSR characteristics are a result of a micro points of contact between the FSR (either ShuntMode or ThruMode) sheet and the mating substrate caused by the bumps on the surface of the substrate. As a result, a higher amount of force is required to bring the surfaces into contact, and a higher amount of force is required to produce equivalent levels of resistance. In addition to creating a larger dynamic range across the entire spectrum, these micro-bumps greatly increase useful data from initial contact.

Electronic drum 50 of FIG. 19 has discrete strike zones such as strike zones 51, 52 and 53 designed with rubber pad over multiple-zoned FSR sensors for tabletop playing. Electronic drum 50 is also formed to fit between the player's legs or in their lap like a bongo, or worn marching band-like with a strap which may be hung from around the neck with a removable body brace 54 so the player can dance with the music. It can be played anywhere. One or more linear pots are included in the design to allow the user to modify the tone or other programmable parameters of the drum.

As discussed above, the keys and strike zones on the Electronic drum are available in two versions; one the senses only the intensity of force applied to a key or strike zone. The other style sensor senses 3-axis force application or position and force sensing for each keys and strike zones. The sensors respond to the user's strike inflections allowing for expression of effects like EQ or voice change as well as determining the volume of the note.

Velocity and position control in each strike zone pad measure the intensity of applied force as well as position. Rubber over sensor for comfortable hand drum playing, or playing with sticks. Included in the design is a body brace support for wearing with a neck strap.

Each pad is discrete and can respond independently to a hit. There are one or more linear pots that are user programmable and can be used to change the pitch of voice or other characteristics. The sensors are covered in rubber to reduce acoustically projected sound from the instrument and for hand-drum playing comfort, and to extend the life of the sensors when struck with sticks. The Up/Down—Right/Left—Enter function control keys are FSR keys and are used to change and navigate any function such as how keys respond to finger position, assignment to the linear pot, as well as changing the voice of the instrument. There is a collapsible thigh brace that triggers a Squeeze sensor for playing while sitting.

A Electronic guitar or Syntar such as Electronic guitar 60 illustrated in FIGS. 20 through 43 is a six string acoustic/electronic hybrid guitar which includes controller 61 that can produce output signals corresponding to audio string excitement such as volume after the string is released. It also will produce a signal proportional to the amount of pitch bend in the neck, or whether the string is strummed up or down with the use of RockingBridge sensor assembly 63. Fretboard 64 uses linear pots 65 for each string 66 for calibrated pitch or frequency positions. Each linear pot such as linear pot 65 are flanked with FSR sensors such as FSR sensors 67 and 68 each side of each linear pot to establish force sensing and to assist in note bend determination amount. The combination of RockingBridge 63 coupled with the linear pot/FSR aid in the interpretation of all gestures or emotional expressions applied to each string in conjunction with the strumming or other activation of the strings 66. This expressive combination also facilitates the hammer-on note excitement.

Strings 66 are strung with typical guitar mechanism like an adjustable string anchor 69 at distal end and mechanical tuning peg 70 at the proximal end of strings 66. Once strings 66 are stretched over RockingBridge sensor assembly 63 and in position they demonstrate good intonation.

Referring now to FIGS. 23-28, strings 66 are stretched over RockingBridge-Sensor assembly 63. The RockingBridge Sensor assembly 63 is located in the position prescribed for the bridge to maintain a correct tonal scaling and includes an FSR sensor such as FSR sensors 71 for each string. Strumming along X-axis 72, perpendicular to the strings 66 and Y-axis 73 can be detected by use of two discrete FSR elements 71A and 71B. Each discrete FSR element is located under each side of each RockingBridge string support such as support actuators 74.

Adjustable string anchor 69 is adjusted so that just enough, but not too much force is applied to each RockingBridge Sensor such as sensors 71 to sound a good tone and to derive the widest dynamic range when strings 66 are strummed, plucked, or bent. If additional offset is required to balance optimal string tension and optimal string force applied to sensors 71, spacers may be inserted between the FSR membrane layers to offset RockingBridge sensor assembly 75.

Referring now to FIG. 22, fretboard 64 is composed of membrane 64M with one or more LinearPots 65 under each string and establishes the "virtual fret" location or the location may be determined using discrete resistor pads 75 beneath the strings. Two notes positions can be achieved [essentially] simultaneously by reading the LinearPot fixed resistor value of the from each end. The Electronic virtual note value for a string is detected by the position on the LinearPot. Audio note output is achieved by pumping voltage from a biasing resistor directly to an amplifier. The string expression is derived by both the force applied to the RockingBridge sensor and by the FSR LinearPot of the neck. A note is not activated until the string is released. The further the string is pulled back and released the louder the note will be sounded. Hammer-On notes are achieved by simply striking a note position on the neck.

To simulate and achieve the realistic feel of a fretted electronic guitar controller, which includes strings as a triggering mechanism, an abrasion resistant fret such as frets 75 has been developed. Without a fret a buzz-free string would require tighter tolerances and increase the cost. To that end, frets 75 are formed of a UHMW (ultra-high molecular weight-polyethylene), polypropylene, or metal as a layer. This component acts as a true stop for the string and reduces the buzz.

There are distinguishable footprints from a strummed string versed a picked string, a bent string, palm mutes or neck mutes. The characteristic distinctions will be characterized and stored in firmware. The Syntar, electronic instrument 60 will output both MIDI/USB. By using a traditional tuned string mechanism along with the sensitivity of RockingBridge sensors, the release of the string delivers the correct pitch. The RockingBridge sensor can be used to tune the Syntar's strings. The RockingBridge sensor simulates the string oscillation so well that there is a ¼ output for plugging into an amplifier.

When strings 66 are depressed enough to touch a fret on the neck to determine pitch. A note is not sounded until the string is released. The fretboard responds to hammer-on triggering (note is sounded when fretboard is struck). The hammer-on trigger is "automatically" differentiated from a "string-release" trigger by the analysis of various characteristic parameters of each. The intended expression of the string is activated when the string is released. The RockingBridge determines the volume of the strum. If there is a rapid quick release the string is considered to be either picked or strummed. If after a string is picked or strummed a varied signal is sent from the Virtual Fret Sensors then the note is considered to be bent. The amount of bend is determined by the degree of change in resistance value that the FSR/LinearPot fretboard outputs, and increased conductance from the RockingBridge sensor. The Up/Down—Right/Left—Enter—control keys are FSR keys and are used to navigate through any application used. The instrument outputs MIDI and USB and is designed for open platform.

An alternate configuration for electronic guitar 60 is illustrated in FIGS. 29-48 that illustrate several alternative continuous string simulators that include the fret section and the strummer section.

Referring now to FIGS. 29-33, guitar neck 81 is designed to enable travel of this string simulator. It also incorporates note bending response as well as hammer-on. Each string simulator such as string simulators 82 and 83 is formed by string membrane 84 overlaying FSR sensors 87A and 87B on substrate 88. Pressing straight down on the membranes of multiple string simulators as in a bar chord, both the sensors on both sides of the string's linear pot are activated. As the note is bent, the embossed or otherwise formed, membrane 84 collapses and pinches the FSR circuit or circuits causing force on the force sensing resistor sensors positioned on one or both sides of a string simulator's linear pot which is used for pitch detection. The amount of force exerted on the sensor can be interpreted as the amount of note bend. While bending a note, if the finger should reach to the adjacent string simulator's force sensor, extreme note bend is sounded in response.

In string simulator 91 of FIGS. 34-48, multiple string simulator vanes such as vane 92 are embedded into flexible form 93. Vanes such as vane 92 are formed of any suitable hard, flexible material such as urethane or other polymers. Flexible form 93 may be made of any suitable material such as silicon, rubber or other polymer. Flexible form 93 includes elements such as pull-through tie-downs 95 that connect form 93 and vanes 92 to base 97 and support web 98 that suspends the vanes 92 above the FSR membrane 99.

Vanes such as vane 92 may includes a continuous "fret-like string" to be fed through openings such as fret openings 94 with an opening at the bridge end of the neck/body. The "fret-like string" is kept in place by braces that are designed to maintain the neck integrity, and keep the neck from splaying open when the string is pulled when bending a note. A printed circuit board, base 97, includes silicone rubber covered FSR 99 secured under the "string system" and detects string pulls, pushes, and strummed string. Vanes 92 may also include slots or openings 96 to provide a more accurate simulation of conventional guitar strings and provide discrete locations 96X for flex when force is applied to the strings.

Figure 44:
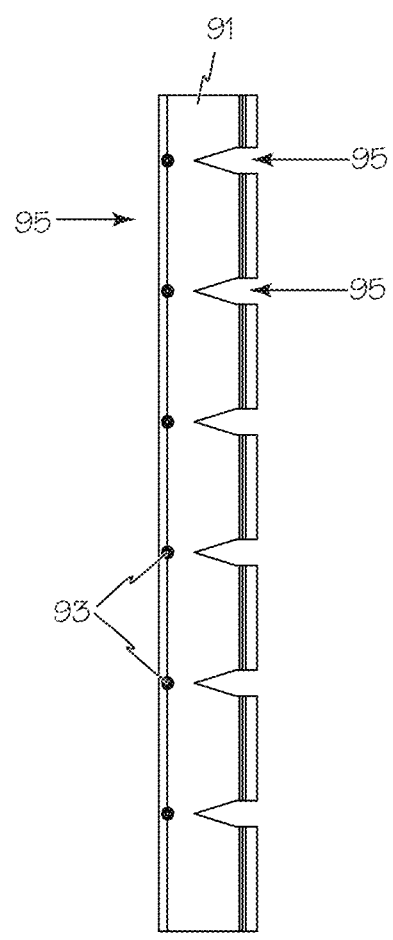
FIG. 44 is a side view of a vane for the continuous string simulator of FIG. 34.
Figure 45:
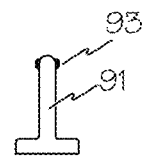
FIG. 45 is an end view of a vane for the continuous string simulator of FIG. 34.
Figure 46:
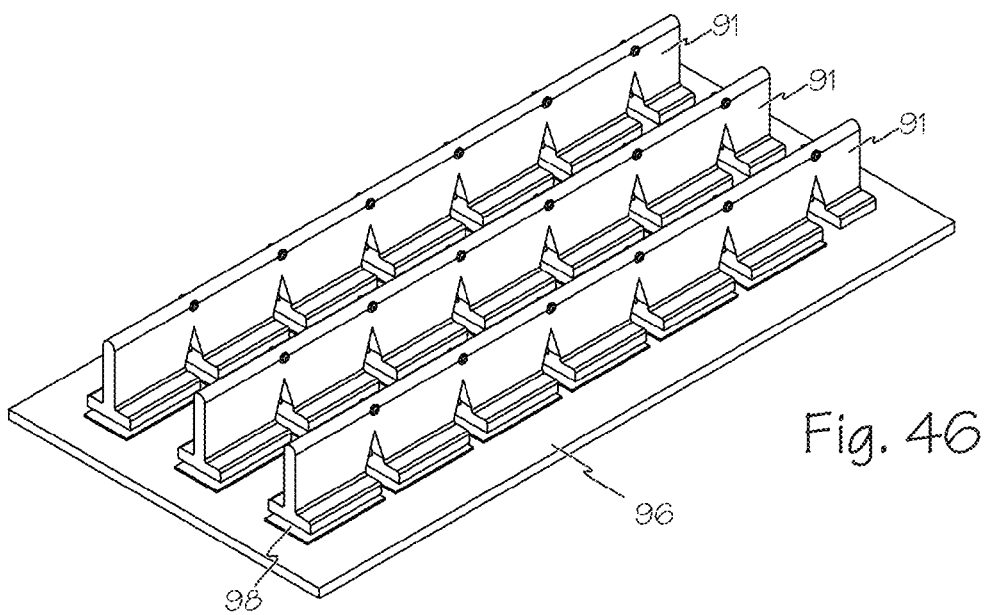
FIG. 46 is a perspective view of the substrate for a continuous string simulator with vanes oriented for use.
Figures 47, 48:
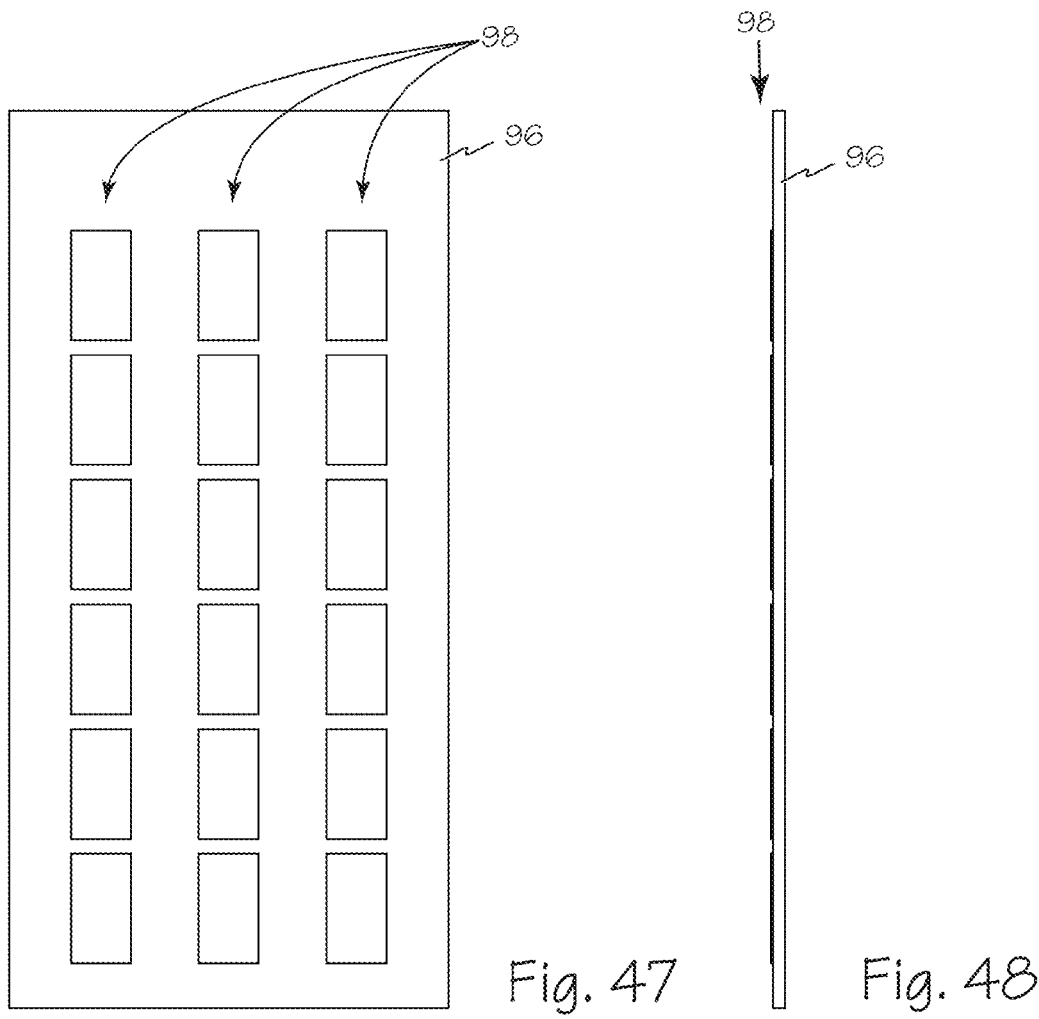
FIG. 47 is a front view of the substrate of FIG. 46 with rubber pads.
FIG. 48 is a side view of the substrate of FIG. 46 with rubber pads.
Figure 49:
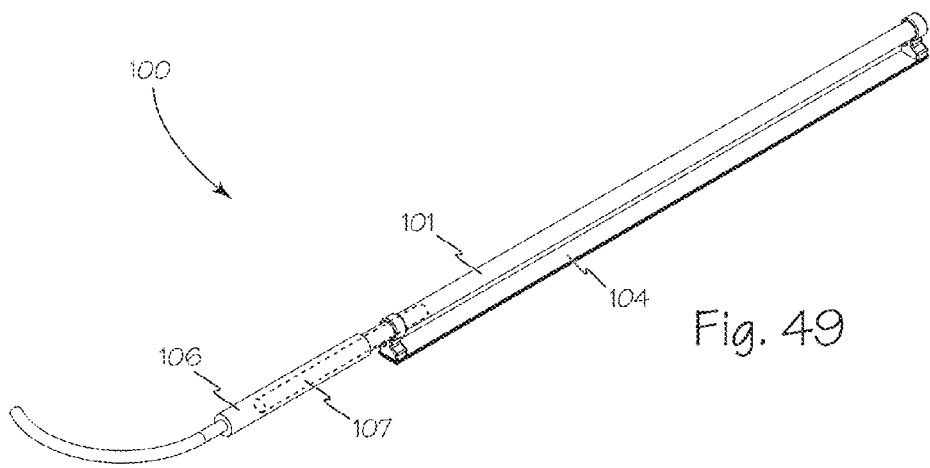
FIG. 49 is a perspective view of a electronic bow.
Figure 50:
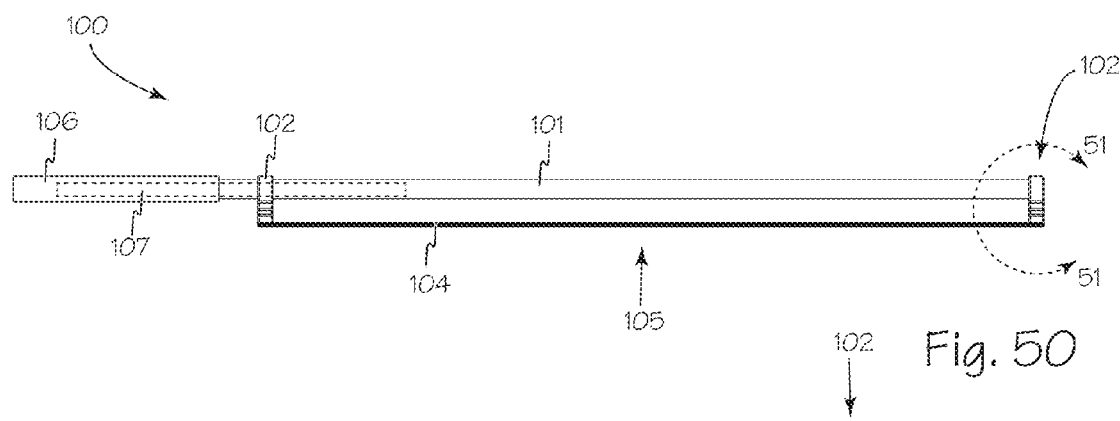
FIG. 50 is a side view of the electronic bow of FIG. 49.
Figure 51:
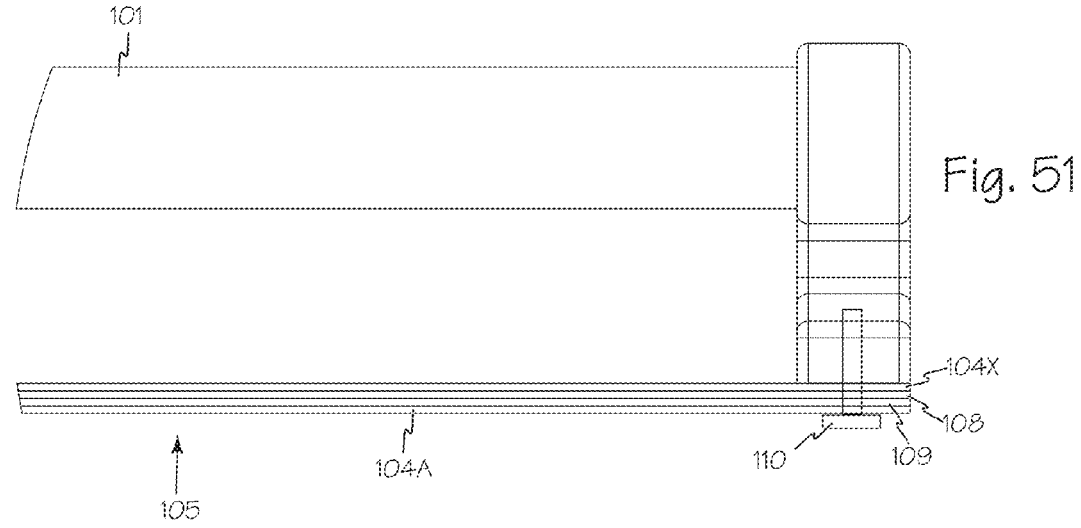
FIG. 51 is a close-up view of a portion of the electronic bow view of FIG. 50 taken along 51-51.
Figure 52:
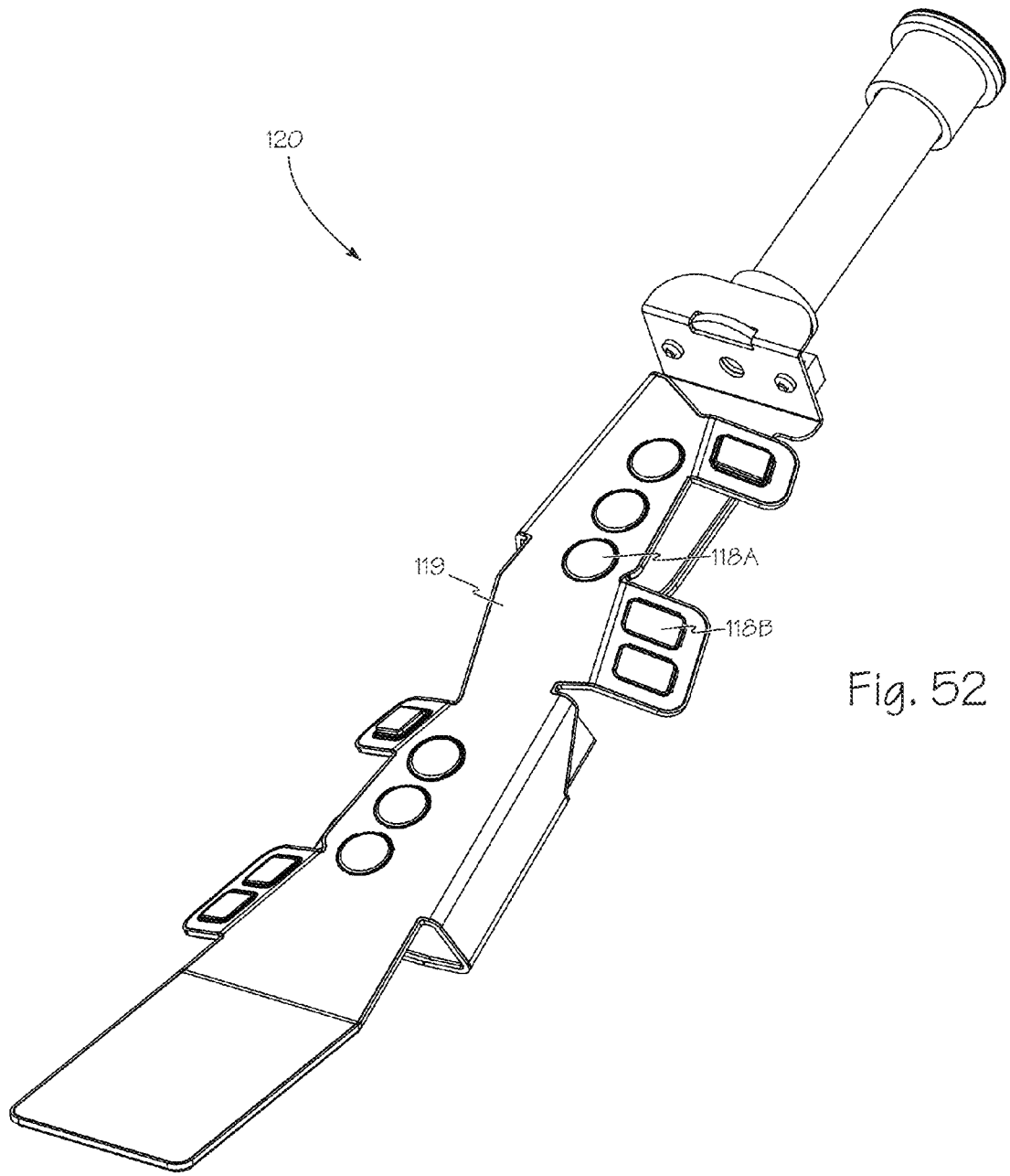
FIG. 52 is a perspective view of a electronic wind instrument.
Figures 53, 54, 55:
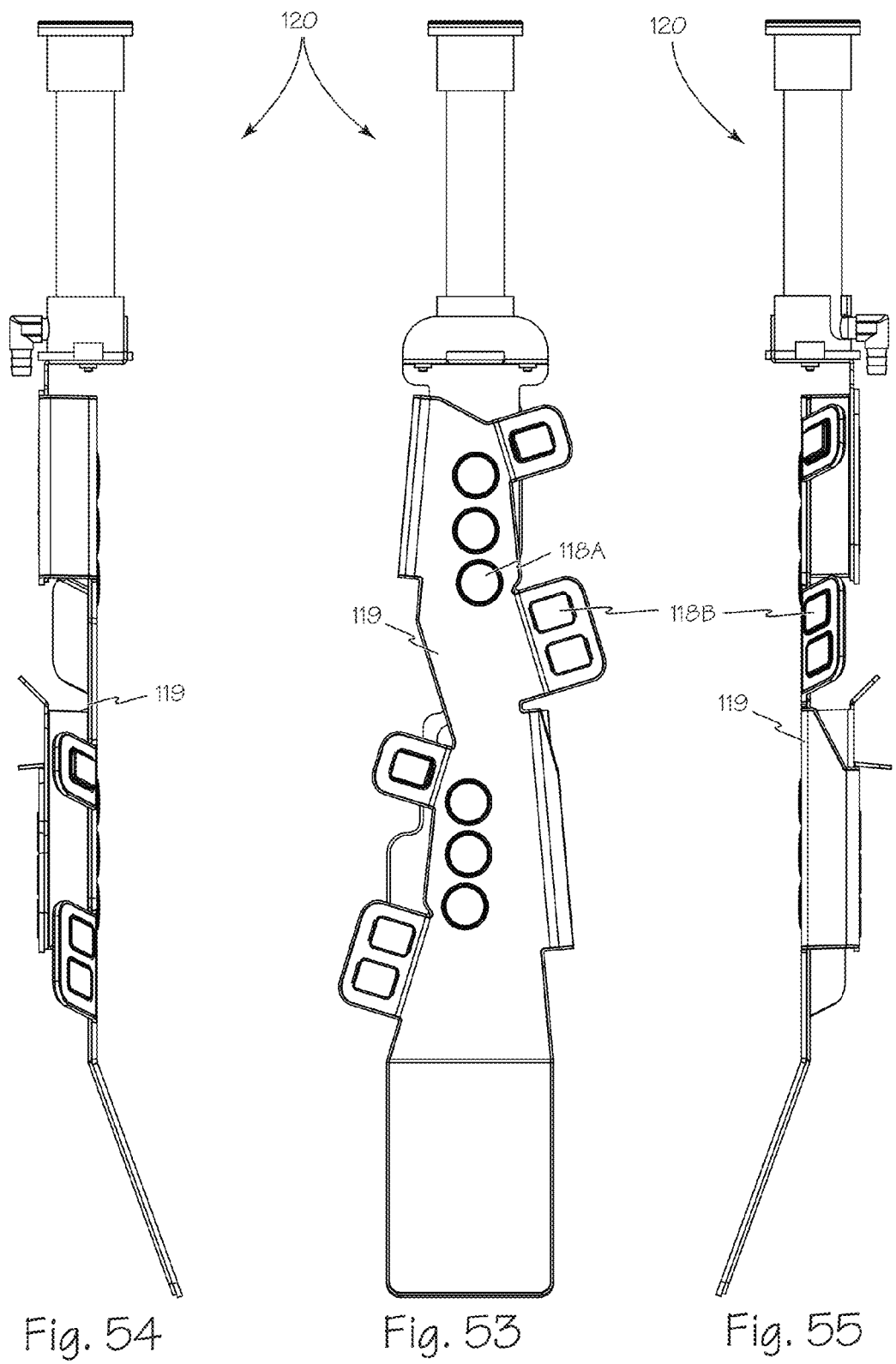
FIG. 53 is a front view of the electronic wind instrument of FIG. 52.
FIG. 54 is a right side view of the electronic wind instrument of FIG. 52.
FIG. 55 is a left side view of the electronic wind instrument of FIG. 52.

Electronic bow 101 of FIGS. 44-46 is used for applying force to a string or string simulator. Electronic bow 101 includes tubular element 102 with a tensioning mount, such as tensioning mount 103, at one or both ends for adjusting tension of linear sensor 105. Linear sensor 105 has flexible layer 105A adhered to contact surface 106 to improve friction and add "grab" when pulled over a string or string simulator. Linear sensor 105 may be formed of any suitable rubber, plastic or polymer material. Tension adjusting handle 107 and or tubular element 102 enclose operational electronics 108. Electronic bow 101 may be wired or wireless. Linear sensor 105 is composed of fixed resistor layer 109 deposited on PET layer 105X, and wiper layer 110 between resistor layer 109 and flexible layer 105A. Linear sensor 105 is secured to tension mounts 103 using any suitable adhesive or any suitable fastener such as fastener 111.

Electronic wind instrument 121 of FIGS. 52 through 58 is a synthesized electronic wind instrument. Instrument body 120 has a wind instrument form-factor with fingering similar to a flute, clarinet or saxophone. Each key such as FSR keys 119A and 119B has a "Trampoline" style button or FSR key, as discussed above, made of embossed plastic raised surface to give tactical feedback and to help the player locate the button's position and state of activation. The essence of the Trampoline sensor or FSR key is to increase the travel of the switch/sensor and to minimize the hard feel at the end of travel of a rigid backed substrate. The trampoline system achieves this by cutting out an opening in the rigid substrate that outlines the shape of the switch/sensor. The keys such as FSR keys 119A and 119B are FSR sensors for multiple uses such as expressive playing without blowing.

Figures 56, 57:
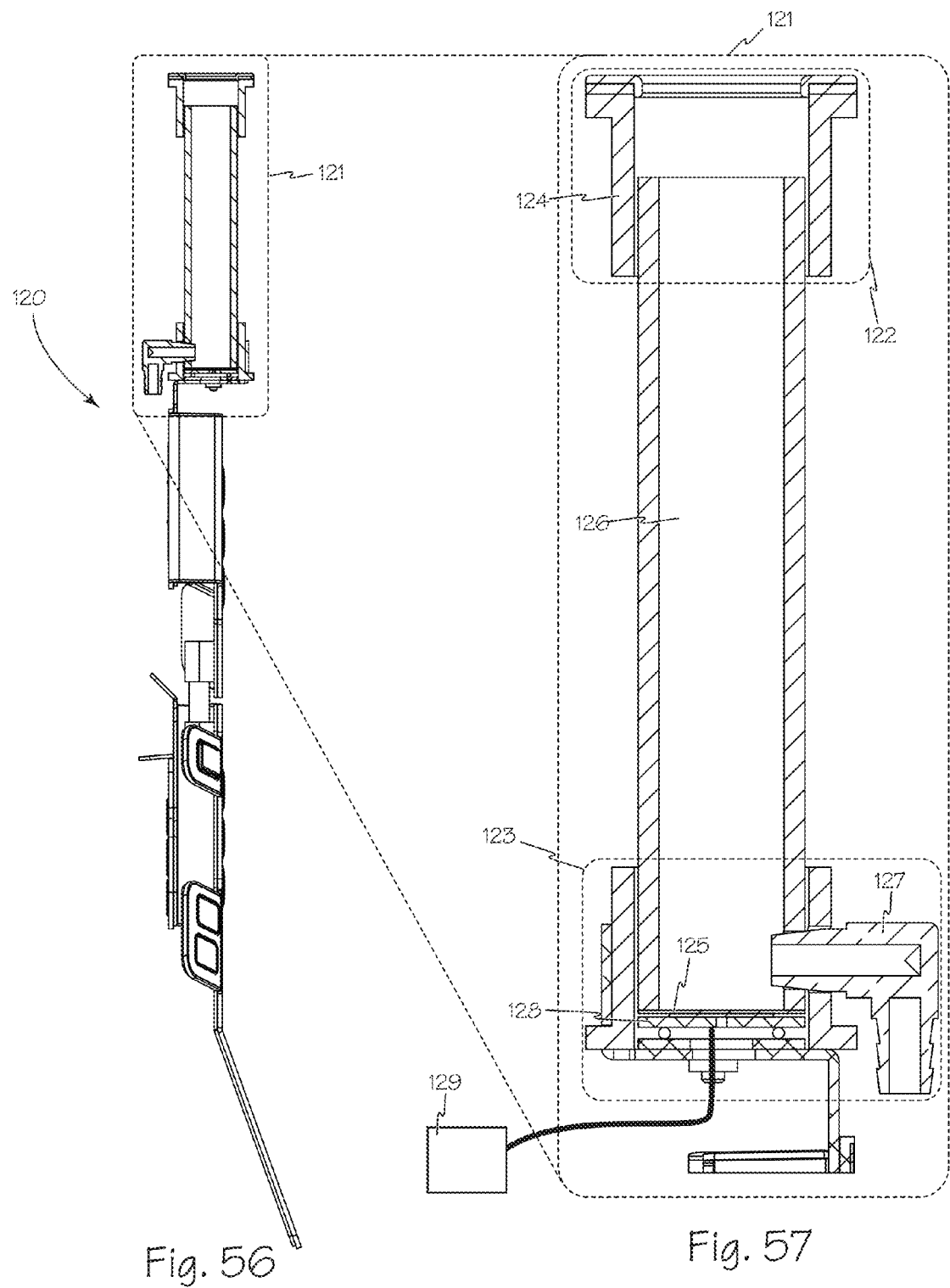
FIG. 56 is a cross-section view of a electronic mouthpiece for brass and wind instruments.
FIG. 57 is a close-up view of the mouthpiece of FIG. 56.
Figure 61:
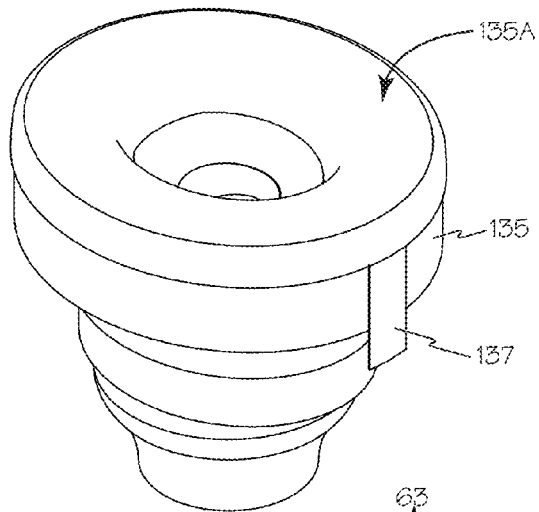
FIG. 61 is a perspective view of an alternate purse style mouthpiece
Figure 62:
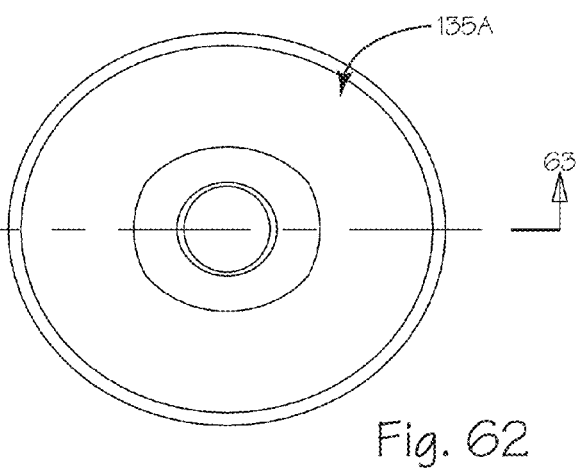
FIG. 62 is a top view of the mouthpiece of FIG. 61.
Figure 63:
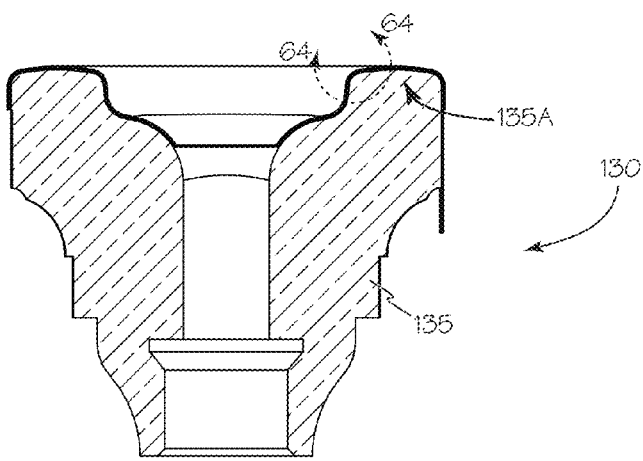
FIG. 63 is a cross-section of the mouthpiece of FIG. 62 taken along 63-63.
Figure 64:
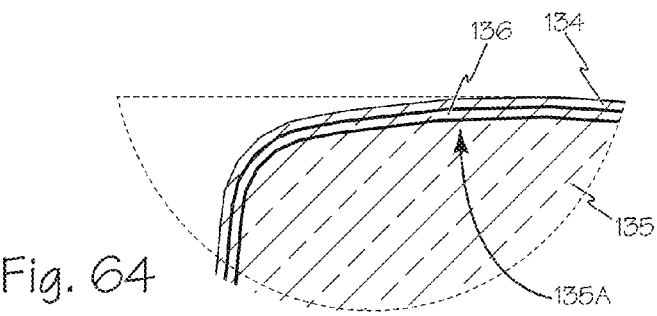
FIG. 64 is a close-up of the cross-section of the mouthpiece of FIG. 63 taken along 64-64.
Figure 78:
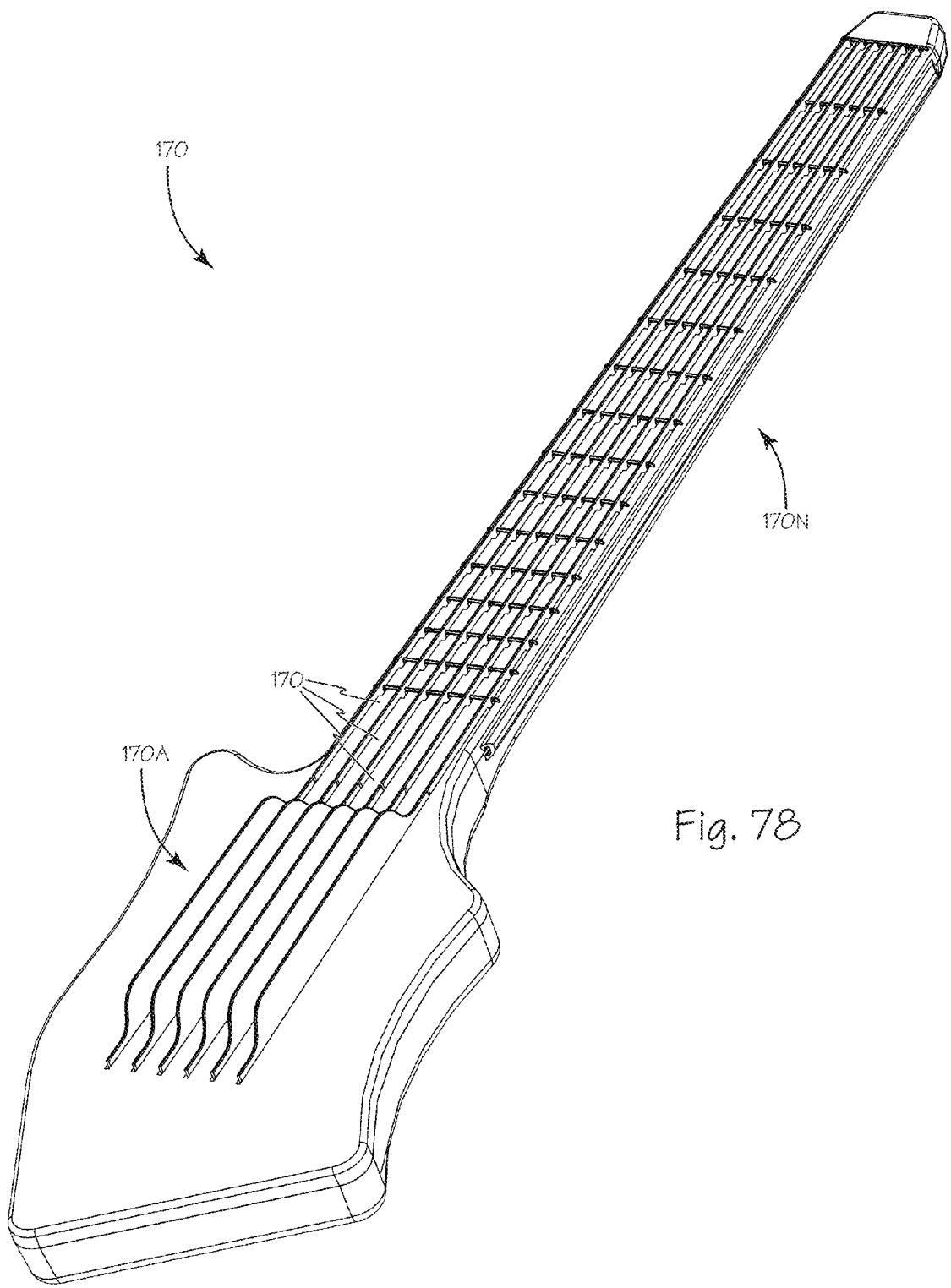
FIG. 78 is a perspective view of an alternate electronic guitar.
Figure 80:
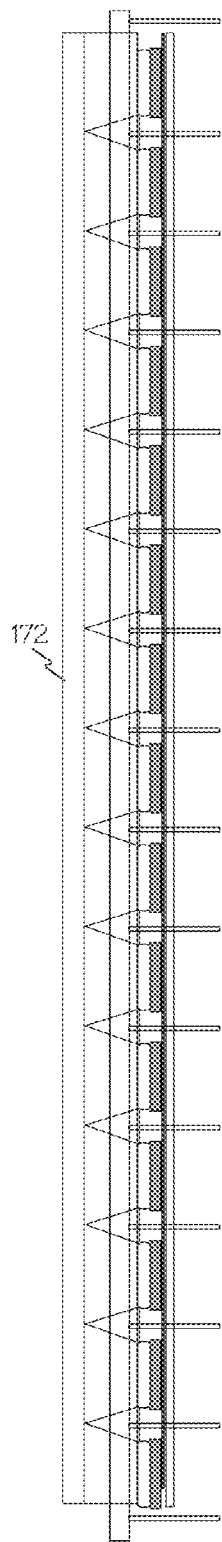
FIG. 80 is a side view of the vanes of the alternate guitar of FIG. 78.
Figure 81:
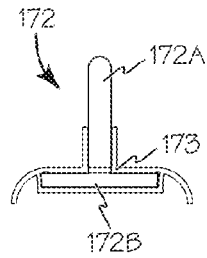
FIG. 81 is an end view of a vane for the alternate guitar of FIG. 78.
Figures 82, 83:
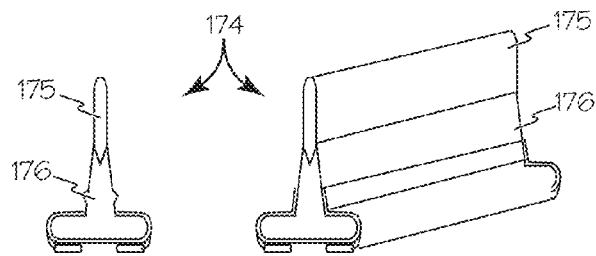
FIG. 82 is an end view of an alternate vane for the guitar of FIG. 78.
FIG. 83 is a perspective view of the alternate vane of FIG. 82.
Figure 79:
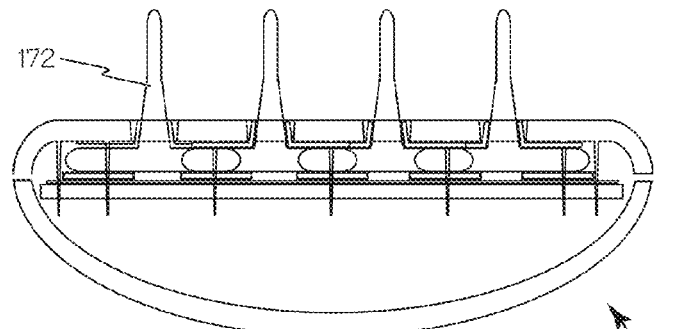
FIG. 79 is a cross-section view of the neck of a four-string configuration of the alternate guitar of FIG. 78.
Figure 84:
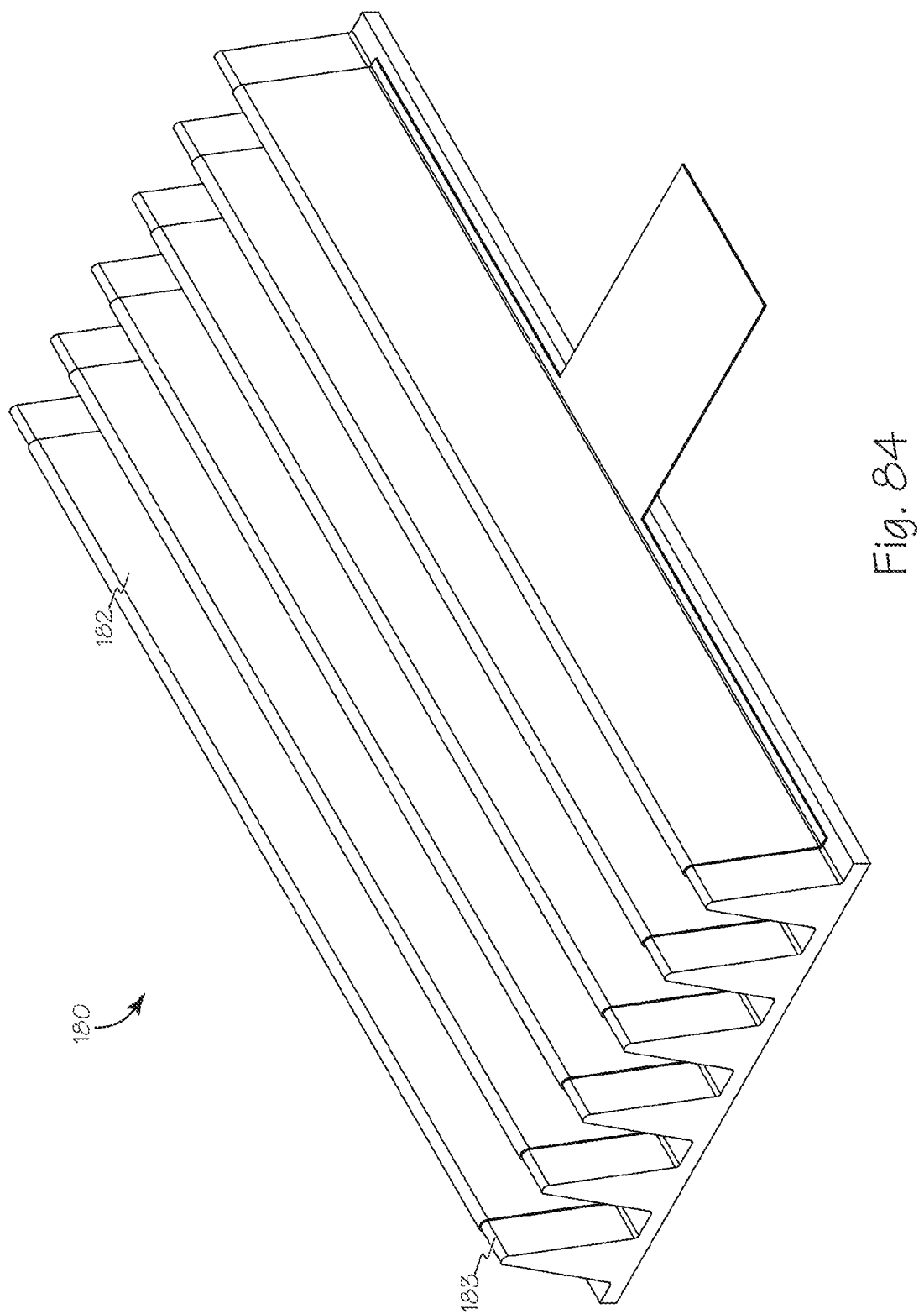
FIG. 84 is a perspective view of a portion of an alternate FSR fretboard for a electronic guitar.

Referring now to FIGS. 56 and 57, mouthpiece 122 is an example of an electronic mouthpiece incorporating FSR sensors, lip sensor 123 and breath sensor 124. Any suitable lip sensor may be used with mouthpiece 122, such as purse sensor 125. In breath sensor 124 the user's breath deforms diaphragm 126 in chamber 127 with bleed off valve 128. The diaphragm 126 is pre-loaded and engages FSR sensor element 129 such that changing pressure in chamber 127 results in a corresponding change in conductivity of FSR sensor 129. Changing conductivity of FSR sensor 129 enables microprocessor 130 to determine the volume of the note based on the force of the user's breath. This can also be made using a ThruMode FSR sensor, where the FSR is printed over the electrodes on the two facing substrates as shown in FIGS. 65-70.

Multiple mouthpiece designs incorporate position and force sensing to enable microprocessor 130 to determine where and how intensely the user is applying lip force against the lip sensor such as purse sensor 125. This information can be interpreted to give emotion to the instrument's voice. Mouthpiece controllers are either brass-style (pursing) lip sensors such as first lip sensor 125 or alternate lip sensor 131 or a woodwind-style mouthpiece 133 as illustrated in FIGS. 58 through 60 with lip sensor 134. The brass-style mouthpiece incorporates two FSR sensors 131A and 131B to determine the position and force of the upper and lower lip respectively. Similarly, mouthpiece 133 incorporates upper and lower lip sensors 134A and 134B respectively.

Referring now to brass-style lip sensor 131 of FIGS. 61-64, sensor 131 is designed to deliver as much expression as possible while maintaining the player's expected or anticipated form factor of that instrument. FSR element or elements are incorporated in layers 135 and 137 which are molded or inmolded with body 136 and connect to a microprocessor or other controller with signal conductors in tail 138. FSR sensor layers 135 and 137 are shaped to conform to lip contact surface 136A of mouthpiece body 136. In the case of the sensor 131, an oval shape may be incorporated to more accurately mirror the shape of the lips and to achieve a greater surface area of contact for the lips to enable greater XYZ response. For electronic instruments such as trombones or larger brass instruments, brass-style lip sensor 131 may have a large body 136 formed with a large oval shape. The area of contact is more than that of an acoustic instrument, but since the instrument is not designed to respond to the players lip "buzz" this alternative design enables controls beyond the expectations of an acoustic instrument.

In the "traditional mode", the instrument reads from the mouthpiece sensor and waits for the user to breath into the mouthpiece to trigger a sound. Once breathe is detected the volume of the note is determined based on the force of the breathe. The instrument can also be played in NoBreathe mode for those who want to sing and play at the same time. All these inputs are combined to give the expression of the note passed to the speaker.

Fundamental frequencies can be created by blowing harder. Breath sensor 124 measures breath pressure applied by a user. The lip position simulates adjusting the resonate chamber in the mouth. Being able to measure the opening and closing of the mouth against the lip sensor simulates the larger and smaller chamber. These two features in conjunction with software are enough to simulate the physics of a brass or woodwind instrument's mouthpiece.

Trampoline Keys. The essence of the Trampoline sensor is to increase the travel of the switch/sensor and to minimize the hard feel at the end of travel from a rigid backed substrate. The trampoline system achieves this by cutting out an opening in the rigid substrate that outlines the shape of the switch/sensor. The Up/down—right/left—Enter function keys are FSR keys and are used to change any function such as how keys respond to finger force, assignment to the linear pot, as well as changing the voice of the instrument.

The wind sensor determines how much breathe is being applied to determine the volume of note to be played. The pursing lip sensor can determine the position and force of each the upper and lower lips upon the sensor. The force applied to the key buttons can be used in the NoBreathe mode for expression of any programmable expression assigned to it. User input keys are used to change the instrument voice and other functions to be determined. All instruments communicate with each other in conductor or player mode so a person as a conductor has encoded data they send to other players to follow along with electronic radio, TV or other.

Referring now to FIGS. 65-70, ThruMode sensor 141 is suitable for lip sensors as discussed above and is formed of first sensor 142 and second sensor circuit 143. First and second sensor circuit elements 142 and 143 are oriented in apposition as shown in FIGS. 69 and 70 for use. Highly conductive electrodes 144 of such inks as silver or carbon are deposited on first substrate 145 and second substrate 146. Conductors 144 are overprinted with FSR elements 147. The silver conductive inks demonstrate more "standoff" and dynamic range than the carbon conductor due to the topography caused by the silver flakes and lack of topography of the micro carbon particles. Dielectric layer or layers 148 are printed on one or both of the first and or second sensor circuit elements 142 and 143 respectively.

ShuntMode FSR lip sensor 151 consists of substrate 153 printed with highly conductive interdigiting finger trace patterns such as trace patterns 154 and 155 made of such conductive inks as silver or carbon, which is oriented in apposition to a second substrate, substrate 157 with FSR elements 159 printed and cured upon it.

Electronic trombone 161 of FIGS. 74-77 uses any suitable lip sensor 162 such as brass-style lip sensors 125 and 131 to sense exerted pressure and position of the upper and lower lips. It also used the FSR pressure chamber and release valve for amplitude. Linear Pot 163 is used to determine the position of the "slide for pitch identification. Alternatively, a proximity or distance sensor such as IR can be used to measure the position of the slide.

Referring now to FIGS. 78 through 83, alternate electronic guitar 171 includes extruded elastomer elements or vanes such as vanes 173 in place of conventional guitar strings. Vanes 173 extend from strum area 171A all along neck 171N. The shape of vanes 173 is a variation of the segmented inverted "T" formed vanes 92 discussed above. Vanes 173 may be formed of separate elements 173A and 173B secured together by elastomer 174. Alternatively, vane 175 may be formed of two different co-molded materials flexible portion 176 and structural portion 177.

FIGS. 84 through 87 illustrate an alternate fretboard 181 consisting of FSR membrane 183 over a flexible set of ribs 184 representing the instrument strings.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. An electronic musical instrument comprising:
   an instrument body having a plurality of FSR keys for producing different musical notes;
   wherein at least one of the FSR keys is an FSR sensor comprising:
      two parallel substrates in an orthogonal space having an x-axis perpendicular to a y-axis and both the x and y axes perpendicular to a z-axis, each substrate parallel to the x and y axes and perpendicular to the z-axis, each substrate having an active area;
      one or more FSR elements on the active area of each substrate, the active areas oriented in apposition to form a sensor active area;
      a sensor support having an opening sized and dimensioned to correspond to the sensor active area; and
      wherein the two parallel substrates are secured to the sensor support with the sensor active area and the sensor support opening parallel to each other and centered on the z-axis and perpendicular to the z-axis; and
   a strum rod assembly having at least two strum rods, the strum rod assembly operably connected to the instrument body.

2. An electronic musical instrument comprising:
   an instrument body having a plurality of FSR keys for producing different musical notes;
   wherein at least one of the FSR keys is a trampoline sensor comprising:
      two parallel substrates in an orthogonal space having an x-axis perpendicular to a y-axis and both the x and y axes perpendicular to a z-axis, each substrate parallel to the x and y axes and perpendicular to the z-axis, each substrate having an active area;
      one or more FSR elements on the active area of each substrate, the active areas oriented in apposition to form a sensor active area;
      a sensor support having an opening sized and dimensioned to correspond to the sensor active area; and
      wherein the two parallel substrates are secured to the sensor support with the sensor active area and the sensor support opening parallel to each other and centered on the z-axis and perpendicular to the z-axis; and
   a strum rod assembly having at least two strum rods, the strum rod assembly operably connected to the instrument body.

* * * * *